United States Patent [19]
Suzuura et al.

[11] Patent Number: 6,066,404
[45] Date of Patent: May 23, 2000

[54] PACKAGING CLEAN FILM AND PACKAGING POUCH

[75] Inventors: Yasuki Suzuura; Hiroshi Yamamoto; Miho Ono; Masahisa Yamaguchi, all of Tokyo-To, Japan

[73] Assignee: Dai Nippon Printing Co., Ltd., Japan

[21] Appl. No.: 08/627,181

[22] Filed: Apr. 3, 1996

[30] Foreign Application Priority Data

Apr. 5, 1995 [JP] Japan ................................. 7-104660

[51] Int. Cl.⁷ .................................................. B32B 27/32

[52] U.S. Cl. ........................ 428/516; 428/523; 428/35.2; 428/35.7; 428/41.3; 428/41.7; 206/484; 206/524.2

[58] Field of Search ................................. 428/35.2, 35.3, 428/35.7, 41.7, 41.8, 41.3, 523, 516; 206/484, 484.1, 484.2, 524.2

[56] References Cited

U.S. PATENT DOCUMENTS

| | | | |
|---|---|---|---|
| 4,077,830 | 3/1978 | Fulwiler | 428/41.8 |
| 4,287,255 | 9/1981 | Wong et al. | 428/41.8 |
| 4,420,519 | 12/1983 | Slemmons | 428/41.7 |
| 4,528,222 | 7/1985 | Rzepecki et al. | 428/34.2 |
| 4,529,087 | 7/1985 | Neal et al. | 206/524.2 |
| 4,716,069 | 12/1987 | Burke | 428/167 |
| 5,283,127 | 2/1994 | Blumenstein et al. | 428/516 |
| 5,354,597 | 10/1994 | Capik et al. | 428/343 |
| 5,401,547 | 3/1995 | Blackwell et al. | 428/41.8 |
| 5,518,790 | 5/1996 | Huber et al. | 428/35.2 |

*Primary Examiner*—Rena L. Dye
*Attorney, Agent, or Firm*—Parkhurst & Wendel, L.L.P

[57] ABSTRACT

Each of a pair of clean packaging films comprises a base structure consisting of a base layer and a heat-sealing layer, an outer protective film, and inner protective film. The pair of clean packaging films are superposed after the outer and the inner protective films are peeled off, and the superposed pair of packaging clean films are sealed properly to obtain pouches having clean inside and outside surfaces.

2 Claims, 24 Drawing Sheets

PACKAGING CLEAN FILM AND PACKAGING POUCH

TECHNICAL FIELD

The present invention relates to a packaging clean film and a packaging pouch suitable for packaging clothing or such necessary for persons participating in manufacturing delicate articles to which dust particles and other contaminants are extremely detrimental, such as semiconductor products, to wear, methods of manufacturing such a packaging clean film and such a packaging pouch, and an apparatus for carrying out the method.

BACKGROUND ART

Semiconductor devices, such as IC devices and LSI circuit devices are manufactured in a clean room because semiconductor devices requires utmost elimination of dust particles. Therefore, packaging materials for packaging clothing and such to be worn by persons participating in manufacturing semiconductor devices must be free from dust particles and other contaminants. Accordingly, packaging materials to be used in a clean environment are produced in a clean room and washed with ultrapure water. Preparation of such clean packaging materials needs cleaning means for cleaning packaging materials produced in a clean room with ultrapure water, which requires complicated apparatuses and increases the manufacturing cost. Furthermore, the cleanliness of articles packaged in packaging materials is dependent on the uncertain degree of cleaning of the packaging materials with ultrapure water.

SUMMARY OF THE INVENTION

The present invention has been made in view of those problems and it is therefore an object of the present invention to provide a packaging clean film and a packaging pouch not requiring any cleaning means using ultrapure water and having stable cleanliness, a method of manufacturing such a packaging clean film and a packaging pouch, and an apparatus for carrying out the method.

According to a first aspect of the present invention, a packaging clean film comprises a base structure having a heat-sealing layer forming its inside surface, and a protective layer laminated to the base structure so as to be removable.

According to a second aspect of the present invention, a packaging clean film comprises a heat-resistant base, first and second melt extruded layers laminated to the outside and the inside surface of the heat-resistant base, respectively, and first and second protective layers laminated to the first and the second melt extruded layer, respectively.

According to a third aspect of the present invention, a packaging pouch is formed by a method comprising steps of preparing a pair of packaging clean films each comprising a base structure having a heat-sealing layer forming an inside layer, and an inner protective layer removably laminated to the inside surface of the base structure; peeling off the inner protective layers from the inside surfaces of the packaging clean films to expose the clean surfaces of the heat-sealing layers; superposing the pair of packaging clean films with the heat-sealing layers thereof facing to each other; and sealing the peripheral portions of the superposed pair of packaging clean films to leave an open edge portion of the packaging pouch.

According to a fourth aspect of the present invention, a packaging pouch is formed by a method comprising steps of preparing a pair of packaging clean films each comprising a base structure having a heat-sealing layer forming an inside layer, and outer and inner protective layers removably laminated to the outside and the inside surface of the base structure, respectively; peeling off the inner protective layers of the packaging clean films to expose the clean surfaces of the heat sealing layer; and superposing the pair of packaging clean films with the heat sealing layers thereof facing to each other and sealing the peripheral portions of the superposed pair of packaging clean films to leave an open edge portions of the packaging pouch.

According to a fifth aspect of the present invention, a packaging pouch is formed by a method comprising steps of preparing a pair of packaging clean films each comprising a base structure having a heat-sealing layer forming an inside layer and inner and outer protective layers removably laminated to the inside and the outside surface of the base structure, respectively; peeling off the inner protective layers of the packaging clean films to expose the clean surface of the heat-sealing layer; and superposing the pair of packaging clean films with the heat-sealing layers thereof facing to each other and sealing the peripheral portions of the superposed packaging clean films to leave an open edge portions of the packaging pouch.

According to a sixth aspect of the present invention, a method of manufacturing a packaging clean film comprises steps of arranging first and second protective films on an outside surface and an inside surface of a heat-resistant base structure; laminating the first and the second protective layers to the outside and inside surfaces of the heat-resistant base structure, respectively, with molten resins extruded over the outside and inside surfaces of the heat-resistant base structure.

According to a seventh aspect of the present invention, a packaging pouch manufacturing method comprises steps of preparing a pair of weblike packaging clean films each comprising a base structure having a heat-sealing layer forming an inside layer, and at least an inner protective layer laminated to the inside surface of the base structure; removing the inner protective layers from the inside surfaces of the pair of weblike packaging clean films, superposing the pair of weblike packaging clean films and feeding the superposed pair of weblike packaging clean films into a clean atmosphere; sealing the peripheral portions of the superposed pair of weblike packaging clean films along the traveling direction of the weblike packaging clean films and along the width direction thereof; and cutting the sealed portion of the pair of weblike packaging clean film along the width direction.

According to an eighth aspect of the present invention, a packaging pouch manufacturing apparatus comprises: a clean chamber; a pair of film feed units each storing a roll of a weblike packaging clean film comprising a base structure having a heat-sealing layer forming an inside layer, and at least an inner protective layer laminated to the inside surface of the base structure; a protective layer removing unit disposed close to the clean chamber, for superposing the pair of weblike packaging clean films supplied from the pair of film feed units after peeling off the inner protective layers from the inside surfaces of the pair of weblike packaging clean films and sending the superposed pair of weblike packaging clean films into the clean chamber; a sealing unit disposed in the cleaning chamber, for sealing peripheral portions of the pair of weblike packaging clean films along the traveling direction of the weblike packaging clean films and along the width direction thereof; and a cutting unit disposed behind the sealing unit in the clean chamber for cutting the sealed portion of the pair of weblike packaging clean films along the width direction.

According to a ninth aspect of the present invention, a sealed package comprising a clean packaging pouch manufactured by the steps of preparing a pair of packaging clean films each comprising a base structure having a heat-sealing layer forming an inside layer, and an inner protective layer removably formed on the inside surface of the base structure; removing the inner protective layers from the packaging clean films to expose the clean surface of the heat-sealing layer; and superposing the pair of packaging clean films with the heat-sealing layers facing to each other and sealing the peripheral portions of the superposed pair of packaging clean films, and articles contained in the clean packaging pouch.

DETAILED DESCRIPTION OF THE INVENTION

First Embodiment

A first embodiment according to the present invention will be described hereinafter with reference to FIGS. 1 to 9.

Figure 1:
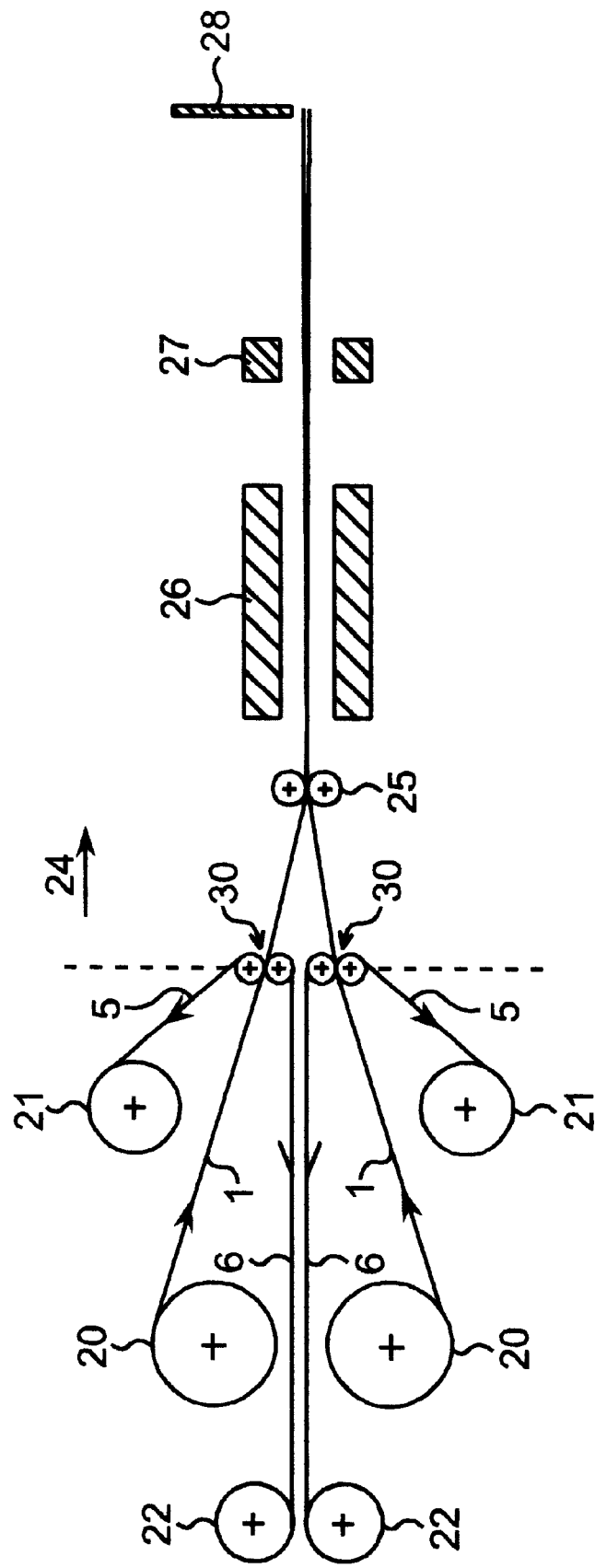
FIG. 1 is a diagrammatic view of a packaging pouch manufacturing apparatus for manufacturing a packaging pouch in a first embodiment according to the present invention.
Figure 2:
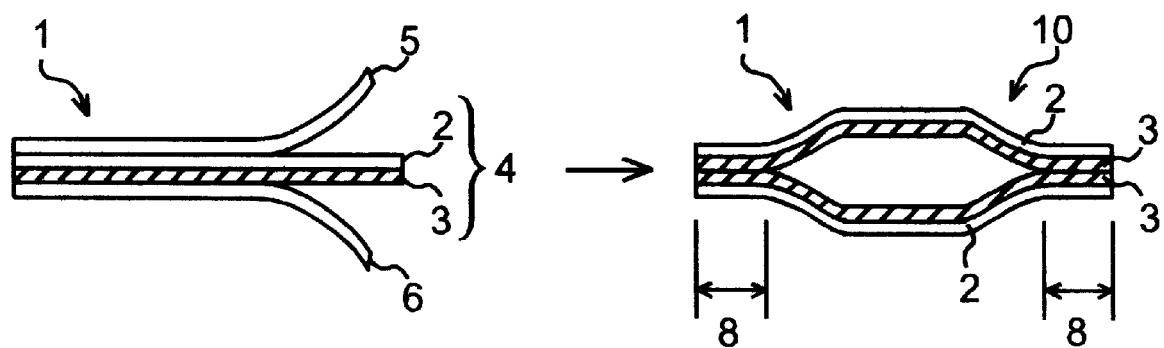
FIG. 2 is a view of a packaging clean film and a packaging pouch in the first embodiment according to the present invention.

Referring to FIG. 1 showing a packaging pouch manufacturing apparatus, the packaging pouch manufacturing apparatus has a clean chamber 24 maintained in an environment substantially equivalent to a Class 100 environment (0.5 $\mu$m) and at a positive pressure. A pair of film feed units 20 storing rolls each of a weblike packaging clean film 1 are disposed before the clean chamber 24 with respect to a film feed direction. As shown in FIG. 2, the weblike packaging clean film 1 has a base structure 4 consisting of a base layer 2 and a heat-sealing layer 3 laminated to the inside surface of the base layer 2, an outer protective layer 5 laminated to the outside surface of the base structure 4, and an inner protective layer 6 laminated to the inside surface of the base structure 4.

Peeling rollers 30 are disposed at the inlet of the clean chamber 24 to peel off the outer protective layer 5 and the inner protective layer 6 from the weblike packaging clean films 1. The outer protective layer 5 and the inner protective layer 6 peeled off from each weblike packaging clean film 1 are taken up by an outer protective film winding roller 21 and an inner protective film winding roller 22 disposed outside the clean chamber 24, respectively.

Disposed behind the peeling rollers 30 in the clean chamber 24 are pressure rollers 25 for pressing together the pair of weblike packaging clean films 1 superposed at the peeling rollers 30. Sequentially disposed behind the pressure rollers 25 are a longitudinal sealing unit 26 for sealing the opposite side edge portions of the pair of weblike packaging clean films 1 along the film feed direction of the weblike packaging clean films 1, a transverse sealing unit 27 for sealing the pair of weblike packaging clean films 1 along the width of the same, and a cutting unit 28 for cutting the pair of weblike packaging clean films 1 along the width of the same.

A packaging pouch manufacturing process will be described hereinafter. The weblike packaging clean films 1 shown in FIG. 2 are fed from the film feed units 20 to the peeling rollers 30. The peeling rollers 30 peel off the outer protective layers 5 and the inner protective layers 6 from the pair of weblike packaging clean films 1. The outer protective layers 5 and the inner protective layers 6 peeled off from the pair of weblike packaging clean films 1 are taken up by the outer protective film winding rollers 21 and the inner protective film winding rollers 22, respectively. The peeling rollers 30 superpose the pair of weblike packaging clean films 1 after peeling off the outer protective layers 5 and the inner protective layers 6, and then feed the superposed packaging clean films 1 into the clean chamber 24. The pressure rollers 25 press together the pair of weblike packaging clean films 1, the longitudinal sealing unit 26 seals the opposite side edge portions of the pair of weblike packaging clean films 1 along the traveling direction of the weblike packaging clean films 1 to form longitudinal sealed edge portions 8 (FIG. 2), and the transverse sealing unit 27 seals the pair of weblike packaging clean films 1 along the width of the same to form transverse sealed edge portions 8. Then the cutting unit 28 cuts the pair of weblike packaging clean films 1 along the width of the same at longitudinal intervals corresponding to the length of a packaging pouch to obtain packaging pouches 10 having one open side 10a (FIG. 6A) and three sealed edge portions (sealed peripheral portions) 8 on its three sides.

The longitudinal sealed edge portions 8 and the transverse sealed edge portions 8 may be formed in the weblike packaging clean films 1 by the longitudinal sealing unit 26 and the transverse sealing unit 27, and the weblike packaging clean films 1 may be transversely cut along the transverse center line of each transverse sealed edge portion 8 by the cutting unit 28 to obtain sealed packaging pouches 10b (FIG. 9) having four sealed edge portions (sealed peripheral portions) 8 on its four sides. When putting articles 9 in this sealed packaging pouch 10b, one of the sealed edge portions 8 is cut off to form an opening. The pair of packaging clean films 1 may be sealed in a flat shape or in the shape of a gusset.

Since the packaging pouch 10 thus obtained is formed by combining the pair of packaging clean films 1 from which the outer protective layers 5 and the inner protective layers 6 are removed immediately before the clean chamber 24, both the inside surface and the outside surface of the packaging pouch 10 are clean. The packaging pouches 10 thus formed are collected and packed in a large clean pouch, not shown, for shipping. The user uses the packaging pouches 10 for packaging, for example, semiconductor devices including IC devices and LSI circuit devices.

Figure 3:
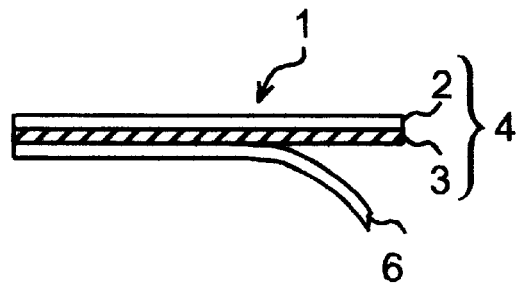
FIG. 3 is a view of another packaging clean film in accordance with the present invention.

A further packaging clean film and a further packaging pouch in accordance with the present invention will be described hereinafter. Referring to FIG. 3, a packaging clean film 1 may be a film having a base structure 4 consisting of a base layer 2 and a heat-sealing layer 3, and an inner protective layer 6 laminated to the inside surface of the base structure 4. Since the packaging clean film 1 shown in FIG. 3 is not provided with any film corresponding to the outer protective layer 5, only the inner protective layer 6 is peeled off from the base structure 4 by the peeling rollers 30 of the packaging pouch manufacturing apparatus shown in FIG. 1.

Figure 4:
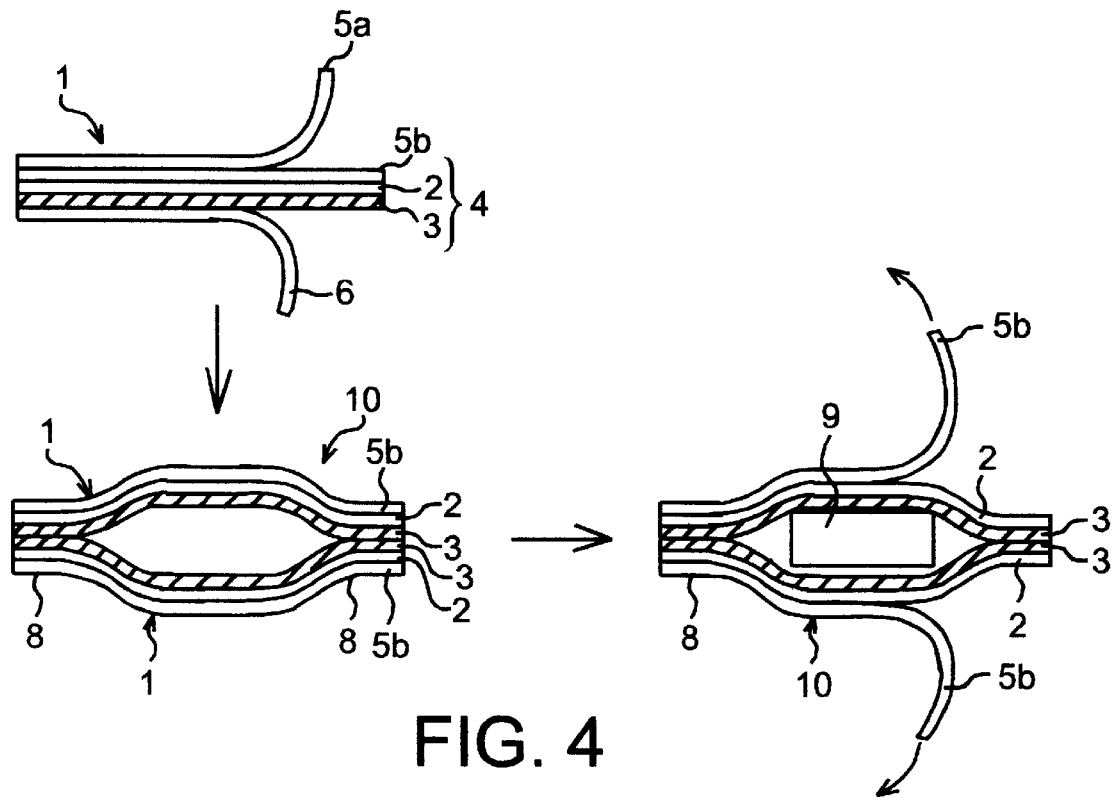
FIG. 4 is a view of a further packaging clean film and a packaging pouch in accordance with the present invention.

FIG. 4 shows a further example of the present invention. As shown in FIG. 4, a packaging clean film 1 may be a film having a base structure 4 consisting of a base layer 2 and a heat-sealing layer 3, a second outer protective layer 5b laminated to the outside surface of the base structure 4, a first outer protective layer 5a laminated to the outside surface of the second outer protective layer 5b, and an inner protective layer 6 laminated to the inside surface of the base structure 4.

When manufacturing packaging pouches 10 by the packaging pouch manufacturing apparatus shown in FIG. 1, the peeling rollers 30 peel off the inner protective layer 6 and the first outer protective layer 5a from each of a pair of packaging clean films 1, and then the pair of packaging clean films 1 are processed to manufacture packaging pouches 10. Articles 9 are put in the packaging pouch 10 thus manufactured through an opening 10a (FIG. 6A), and then the packaging pouch 10 is sealed. The packaging pouch 10 containing the articles 9 is transported through an ordinary transportation route to a clean room in which semiconductor devices or the like are fabricated. The second outer protective layers 5b are removed from the packaging pouch 10 immediately before carrying the packaging pouch 10 into the clean room.

Figure 5:
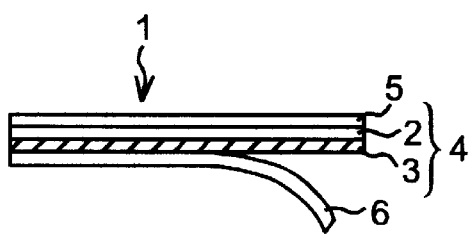
FIG. 5 is a view of a further packaging clean film in accordance with the present invention.

FIG. 5 shows a further example of the present invention. Referring to FIG. 5, a packaging clean film 1 has the same laminate structure as that of the packaging clean film 1 shown in FIG. 2 and has a base structure 4 consisting of a base layer 2 and a heat-sealing layer 3, an outer protective layer 5 laminated to the outside surface of the base structure 4, and an inner protective layer 6 laminated to the inside surface of the base structure 4. The packaging pouch manufacturing apparatus shown in FIG. 1 peels only the inner protective layer 6 from each of a pair of packaging clean films 1 by the peeling rollers 30 and processes the pair of packaging clean films 1 to form a packaging pouch 10. The outer protective layers 5 remaining on the outside surface of the packaging pouch 10, similarly to those of the example shown in FIG. 4, are removed immediately before carrying the packaging pouch 10 into a clean room.

Figure 6A:
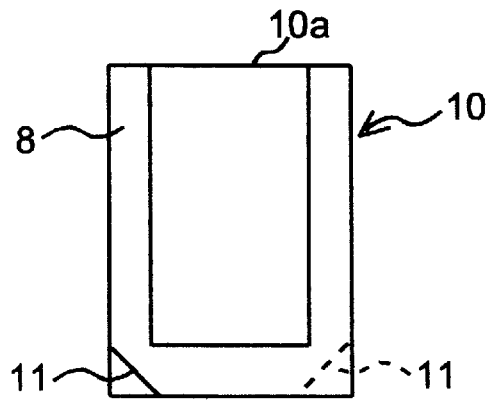
FIG. 6A is a view of a further packaging clean film and a further packaging pouch in accordance with the present invention.
Figure 6B:
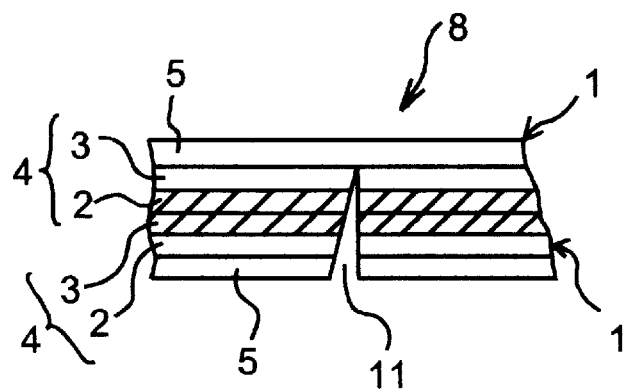
FIG. 6B is a view of a further packaging clean film and a further packaging pouch in accordance with the present invention.
Figure 6C:
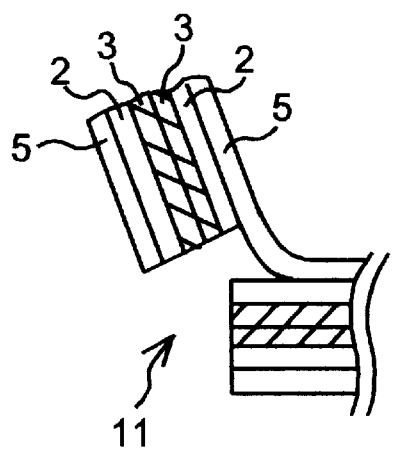
FIG. 6C is a view of a further packaging clean film and a further packaging pouch in accordance with the present invention.

FIGS. 6A to 6C and 7 show further examples in accordance with the present invention. FIG. 6A is a view of a packaging pouch, FIG. 6B is an enlarged view of a portion of the packaging pouch provided with a slit, and FIG. 6C is a view of a portion of the packaging pouch bent along the slit. As shown in FIGS. 6A to 6C and 7, a packaging pouch 10 is formed by processing the packaging clean films 1 shown in FIG. 5, and slits 11 are formed in corners of a sealed edge portion 8. As shown in FIGS. 6A and 6B, the slits 11 are formed in the front and the back surface, respectively, of the packaging pouch 10 so as to extend across the adjacent edges of the packaging pouch 10. As shown in FIG. 6B, each of the sealed edge portions 8 is formed by superposing a pair of packaging clean films 1 each having a base structure 4 and an outer protective layer 5 laminated to the outside surface of the base structure 4, and heat-sealing the superposed packaging clean films 1. As shown in FIG. 6B, the slit 11 formed in the sealed edge portion 8 in a depth from the outer protective layer 5 of the lower packaging clean film 1 to the interface between the base structure 4 and the outer protective layer 5 of the upper packaging clean film 1.

Since the packaging pouch 10 in this embodiment is provided with the slits 11 in the front and the back surface thereof, a corner portion of the packaging pouch 10 containing articles 9 can be bent along the slit formed in one of the surfaces of the packaging pouch 10 as shown in FIG. 6C immediately before carrying the packaging pouch 10 into a clean room and one of the outer protective layer 5 can be easily removed from the packaging pouch 10. Then, another corner portion of the packaging pouch 10 is bent along the slit 11 formed in the other surface of the packaging pouch 10 and the other outer protective layer 5 can be removed from the packaging pouch 10.

Figure 7:
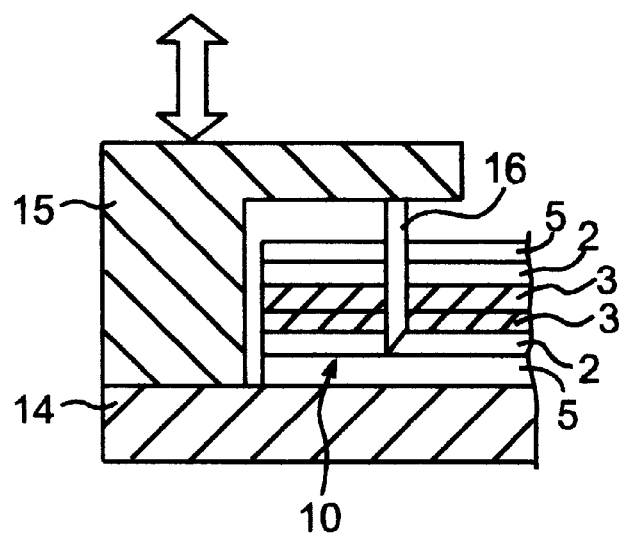
FIG. 7 is a view of a slitting device.

A method of forming the slit 11 will be described with reference to FIG. 7. Referring to FIG. 7, a slitting device has a base 14, a cutting blade 16 of a cemented carbide, and a holder 15 mounted for vertical movement on the base 14. The packaging pouch 10 is placed on the base 14 and the sealed edge portion 8 is cut with the cutting blade 16 to form the slit 11 in a depth from the upper surface of the packaging pouch 10 to the interface between the base structure 4 and the outer protective layer 5 of the lower packaging clean film 1.

Figure 8A:
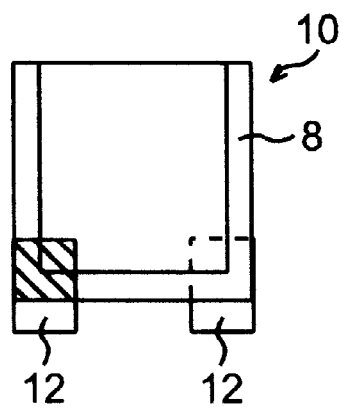
FIG. 8A is a view of a further packaging pouch in accordance with the present invention.
Figure 8B:
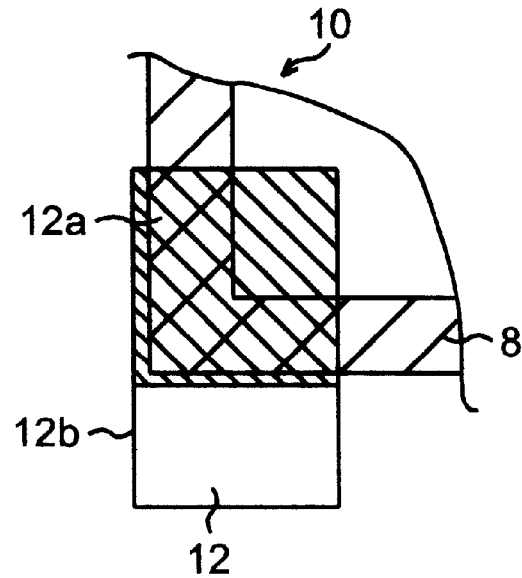
FIG. 8B is a view of a further packaging pouch in accordance with the present invention.
Figure 9:
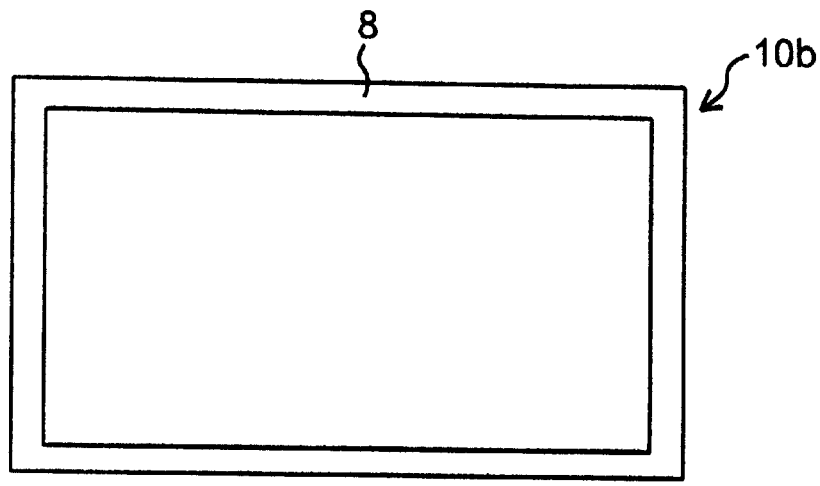
FIG. 9 is a view of a packaging pouch having four sealed sides.

FIG. 8A shows a further packaging pouch in accordance with the present invention and FIG. 8B is an enlarged view of a portion of the packaging pouch of FIG. 8A. In this embodiment, a packaging pouch 10 is formed by processing the packaging clean films 1 shown in FIG. 5, and adhesive pull-tabs 12 are attached to the front and the back surface of the packaging pouch 10 at the corners of a sealed edge portion 8, respectively. As shown in FIGS. 8A and 8B, each adhesive pull-tab 12 has an adhesive portion 12$a$ that adheres to the outer protective layer 5 of the packaging pouch 10, and a nonadhesive portion 12$b$. The adhesive pull-tab 12 is pinched at the nonadhesive portion 12$b$ and pulled to remove the outer protective layer 5. Therefore, the adhesion between the adhesive portion a and the outer protective layer 5 is greater than that between the outer protective layer 5 and the base layer 2 (FIG. 5). The adhesive pull-tabs 12 attached to the front and the back surface of the packaging pouch 10 facilitates removal of the outer protective layers 5 from the front and the back surface of the packaging pouch 10.

Examples of the present invention will be described hereinafter.

EXAMPLE 1

Example 1 corresponds to the embodiment shown in FIGS. 1 and 2. A laminated film of a construction expressed by:

ONy 15 $\mu$m/Anchor coat/LDPE 30 $\mu$m//CPP 50 $\mu$m was formed by coating a surface of a 15 $\mu$m thick oriented nylon film (ONy film) (Santnyl SNW, Mitsubishi Chemical Industries Ltd.) as a primary film, with a 1.0 $\mu$m thick coat of a urethane anchor agent (ADCOAT506X/CAT10, Toyo Morton), and laminating a polypropylene film (Synthetic film 3701T50$\mu$, Toray Industries Inc.) with a low-density polyethylene resin (LDPE resin) (M11P, Mitsui Sekiyu Kagaku) to the ONy film by extrusion.

Then, an LDPE film of an LDPE resin (M-11P, Mitsui Sekiyu Kagaku) and a medium-density polyethylene film (MDPE film) (MPA60$\mu$, Dai Nippon Jushi) were laminated by extrusion to the surface of the oriented nylon film not coated with the anchor agent of the laminated film to produce a laminated packaging clean film of a construction expressed by:

MDPE 60 $\mu$m/LDPE 20 $\mu$m//ONy 15 $\mu$m/Anchor coat/LDPE 30 $\mu$m//CPP 50 $\mu$m Packaging pouches 10 were formed by processing the laminated films of the foregoing construction and peeling off the MDPE/LDPE composite films and the CPP films while the laminated films were being processed. In the laminated film, the MDPE/LDPE composite film is the outer protective layer 5, the ONy film is the base layer 2, the LDPE film is the heat-sealing layer 3, and the CPP film is the inner protective layer 6.

EXAMPLE 2

Example 2 corresponds the embodiment shown in FIG. 3. A laminated film of a construction expressed by:

ONy 15 $\mu$m/Anchor coat/LDPE 30//CPP 50 $\mu$m was formed by coating a surface of a 15 $\mu$m thick oriented nylon film (ONy film) (Santnyl SNW, Mitsubishi Chemical Industries Ltd.) as a primary film, with a 1.0 $\mu$m thick coat of a urethane anchor agent (ADCOAT506X/CAT10, Toyo Morton), and laminating a polypropylene film (Synthetic film 3701T50$\mu$, Toray Industries Inc.) with a low-density polyethylene resin (LDPE resin) (M-11P, Mitsui Sekiyu Kagaku), to the ONy film by extrusion.

Packaging pouches 10 were formed by processing the laminated films of the foregoing construction and the CPP films were peeled off while the laminated films were being processed. In the laminated film, the ONy film is the base layer 2, the LDPE film is the heat-sealing layer 3, and the CPP film is the inner protective layer 6.

EXAMPLE 3

Example 3 corresponds to the embodiment shown in FIG. 4. A laminated film (packaging clean film) of a construction expressed by:

Ny 15 $\mu$m//LDPE 50 $\mu$m/LDPE 20 $\mu$m//ONy 15 $\mu$m/Anchor coat/LDPE 30 $\mu$m//CPP 50 $\mu$m was formed by forming a two-layer film by coextrusion using a nylon resin (5033B, Ube kosan) and a low-density polyethylene resin (M-16, Mitsui Sekiyu Kagaku), and laminating the laminated film in Example 2 to the two-layer film with the surface of the LDPE layer of the coextruded two-layer film and the surface of the ONy film in contact with each other with a film of an LDPE resin (M-11P, Mitsui Sekiyu Kagaku) formed by extrusion.

Packaging pouches were formed by processing the laminated films of the foregoing construction and peeling off the Ny15 μm films and the CPP films while the laminated films were being processed. In the laminated film, the Ny film is the first outer protective layer 5a, the LDPE/LDPE film is the second outer protective layer 5b, the ONy film is the base layer 2, the LDPE film is the heat-sealing layer 3, and the CPP film is the inner protective layer 6.

EXAMPLE 4

Example 4 corresponds to the embodiment shown in FIG. 5. Packaging pouches 10 were formed by processing the laminated films of the construction in Example 1 and only the CPP films were peeled off while the laminated films were being processed.

EXAMPLE 5

Example 5 corresponds to the embodiment shown in FIGS. 6 and 7. Packaging pouches 10 each provided with slits 11 in its opposite surfaces, respectively, were obtained by slitting portions of the opposite surfaces of each of the packaging pouches 10 in example 3, having the second outer protective layers 5b, and the packaging pouches 10 in Example 4 having the outer protective layers 5.

EXAMPLE 6

Adhesive pull-tabs 12 each having an adhesive portion and a nonadhesive portion were made by partially coating a surface processed by a corona discharge process of a 50 μm thick polyethylene terephthalate film (PET film) (E5100, Toyobo) with a 60 μm thick adhesive film of an acrylic adhesive (SK Dyne 1717, Soken Kagaku). The adhesive pull-tabs 12 were attached to the second outer protective layer 5b of the packaging pouch 10 in Example 3 and to the outer protective layer 5 of the packaging pouch 10 in Example 4 to obtain packaging pouches 10 with the adhesive pull-tab 12.

COMPARATIVE EXAMPLE 1

A laminated film of a construction expressed by:

ONy 15 μm/Anchor coat/LDPE 30 μm similar to that of Example 2 and not provided with any film corresponding to the polypropylene film of Example 2 was formed.

Packaging pouches 10 were made by processing the laminated film of the foregoing construction by a conventional method.

Comparative Examination

The degree of contamination of the inside surfaces of the packaging pouches 10 in Examples 1 to 4 and Comparative example 1 were evaluated through the comparative examination of the packaging pouches 10.

Evaluation Method

A fixed volume of isopropyl alcohol (IPA) was injected into the packaging pouch, the inside surfaces of the packaging pouches were rinsed, the particle concentration of the IPA was measured by a liquid-borne particle counter, and the number per square meter of particles of particle sizes of 1 μm or above adhering to the inside surfaces of the packaging pouch was calculated by using the area of the inside surface of the packaging pouch, the volume of IPA injected into the packaging pouch and the particle concentration. Calculated results for the packaging pouches are shown in Table 1.

TABLE 1

| Particles of 1 μm or above in particle size | |
|---|---|
| Samples | No. of particles (Particles/m$^2$) |
| Example 1 | 300 |
| Example 2 | 750 |
| Example 3 | 200 |
| Example 4 | 600 |
| Comp. example 1 | 128,000 |

As is obvious from Table 1, the particle densities on the inside surfaces of Examples 1 to 4 are far less than the particle density on the inside surface of Comparative example 1. The comparative examination proved that the packaging pouches in accordance with the present invention has a small degree of contamination and an excellent cleanliness.

Effect of Examples 5 and 6

The second outer protective layers 5b of the packaging pouch 10 of Example 3, and the outer protective layers 5 of the packaging pouch 10 of Example 4 are removed after packaging articles in those packaging pouches 10. Since the respective outer protective layers 5b and 5 of the packaging pouches 10 of Examples 3 and 4 adhere closely to the surfaces of the base layers 2, respectively, it is difficult to remove the outer protective layers 5b and 5.

Since the packaging pouch 10 in Example 5 is provided with the slits 11 in the corners thereof, the outer protective layers 5 can be easily removed by bending the corner portions of the packaging pouch 10 along the slits 11 and pinching and pulling the protective layers 5 at the corner portions. Since the packaging pouch 10 in Example 6 is provided with the adhesive pull-tabs 12, the outer protective layers 5 can be easily removed by pulling the adhesive pull-tabs 12.

According to the present invention, a clean packaging pouch having a clean inside surface can be easily and surely obtained. The outside surface of the packaging pouch can be kept clean by removing the outer protective layers after sealing articles in the packaging pouch. Accordingly, when the packaging pouch is used in, for example, a clean room in which semiconductor devices are fabricated, the clean room is not contaminated with dust particles and other contaminants. The packaging pouch having a very clean inside surface can be easily and surely obtained.

Second Embodiment

A second embodiment of the present invention will be described hereinafter with reference to FIGS. 10 to 13.

Figure 10:
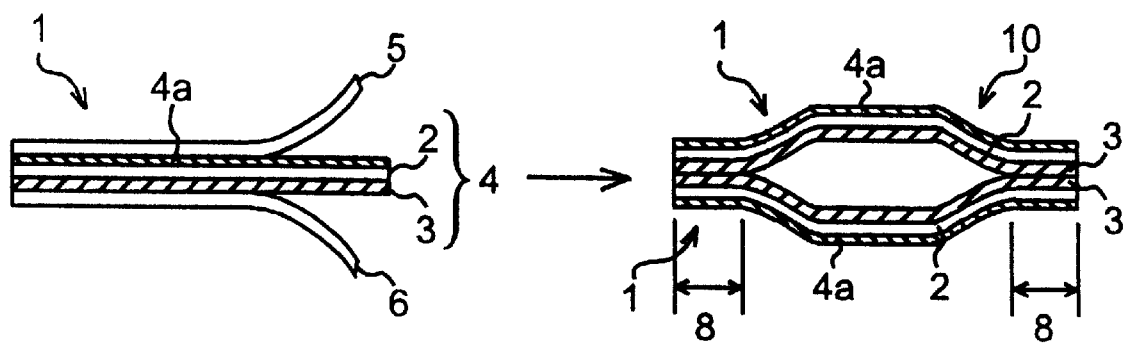
FIG. 10 is a view of a packaging clean film in a second embodiment according to the present invention.

A packaging pouch manufacturing apparatus for manufacturing packaging pouches in the second embodiment is substantially the same in configuration as that for manufacturing packaging pouches in the first embodiment. Referring to FIG. 1, the packaging pouch manufacturing apparatus has a clean chamber 24 maintained in an environment substantially equivalent to a Class 100 environment (0.5 μm) and at a positive pressure. A pair of film feed units 20 storing rolls each of a weblike packaging clean film 1 are disposed before the clean chamber 24 with respect to a film feed direction. As shown in FIG. 10, the weblike packaging clean film 1 has a base structure 4 consisting of a base layer 2 and a heat-sealing layer 3 laminated to the inside surface of the base layer 2, a conductive ink layer 4a coating the outside surface of the base layer 2, an outer protective layer 5 laminated to the outside surface of the base structure 4, i.e., the conductive ink layer 4a, and an inner protective layer 6 laminated to the inside surface of the base structure 4.

Peeling rollers 30 are disposed at the inlet of the clean chamber 24 to peel off the outer protective layer 5 and the inner protective layer 6 from the weblike packaging clean films 1. The outer protective layer 5 and the inner protective layer 6 peeled off from each weblike packaging clean film 1 are taken up by an outer protective layer winding roller 21 and an inner protective layer winding roller 22 disposed outside the clean chamber 24, respectively.

Disposed behind the peeling rollers 30 in the clean chamber 24 are pressure rollers 25 for pressing together the pair of weblike packaging clean films 1 superposed at the peeling rollers 30. Sequentially disposed behind the pressure rollers 25 are a longitudinal sealing unit 26 for sealing the opposite side edge portions of the pair of weblike packaging clean films along the traveling direction of the weblike packaging clean films 1, a transverse sealing unit 27 for sealing the pair of weblike packaging clean films 1 along the width of the same, and a cutting unit 28 for cutting the pair of weblike packaging clean films 1 along the width of the same.

A packaging pouch manufacturing process will be described hereinafter. Referring to FIG. 1, the weblike packaging clean films 1 shown in FIG. 10 are fed from the film feed units 20 to the peeling rollers 30. The peeling rollers 30 peel off the outer protective layers 5 and the inner protective layers 6 from the pair of weblike packaging clean films 1. The outer protective layers 5 and the inner protective layers 6 peeled off from the pair of weblike packaging clean films 1 are taken up by the outer protective layer winding rollers 21 and the inner protective layer winding rollers 22, respectively. The peeling rollers 30 superpose the pair of weblike packaging clean films 1 after peeling off the outer protective layers 5 and the inner protective layers 6, and then feed the superposed packaging clean films 1 into the clean chamber 24. The pressure rollers 25 press together the pair of weblike packaging clean films 1, the longitudinal sealing unit 26 seals the opposite side edge portions of the pair of weblike packaging clean films 1 along the traveling direction of the weblike packaging clean films 1 to form longitudinal sealed edge portions 8 (FIG. 2), and the transverse sealing unit 27 seals the pair of weblike packaging clean films 1 along the width of the same to form transverse sealed edge portions 8. Then the cutting unit 28 cuts the pair of weblike packaging clean films 1 along the width of the same at intervals corresponding to the length of a packaging pouch to obtain a packaging pouch 10 having one open side 10a and three sealed edge portions (sealed peripheral portions) 8 on its three sides. The longitudinal sealed edge portions 8 and the transverse sealed edge portions 8 may be formed in the weblike packaging clean films 1 by the longitudinal sealing unit 26 and the transverse sealing unit 27, and the weblike packaging clean films 1 may be transversely cut along the transverse center line of each transverse sealed edge portion 8 by the cutting unit 28 to obtain a sealed packaging pouch 10b (FIG. 9) having four sealed edge portions 8 on its four sides. When putting articles 9 in this sealed packaging pouch 10b, one of the sealed edge portions 8 is cut off to form an opening. The pair of weblike packaging clean films 1 may be cut by the cutting unit 28 so that a packaging pouch having three sealed sides is formed. The pair of packaging clean films 1 may be sealed in a flat shape or in the shape of a gusset.

Since the packaging pouch 10 thus obtained is formed by combining the pair of packaging clean films 1 from which the outer protective layers 5 and the inner protective layers 6 are removed immediately before the clean chamber 24, both the inside surface and the outside surface of the packaging pouch 10 are clean. The packaging pouches 10 thus formed are collected and packed in a large clean bag, not shown, for shipment. The user uses the packaging pouches 10 for packaging, for example, semiconductor devices including IC devices and LSI circuit devices.

The packaging pouch 10 is sealed after putting articles 9 therein and the packaging pouch 10 containing the articles 9 is transported. The conductive ink layers 4a coating the outside surface of the base structure 4 suppress the accumulation of electric charges that attract dust particles and affect the articles 9 contained in the packaging pouch 10 on the surface of the packaging pouch 10 due to frictional electrification. The conductive ink layer 4a is formed of, for example, a conductive ink prepared by dispersing particles of tin oxide containing antimony in a urethane resin binder in a thickness in the range of 1 to 10 $\mu$m.

Figure 11:
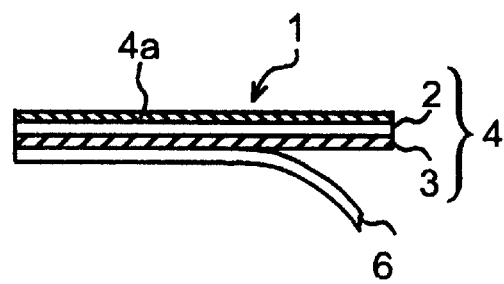
FIG. 11 is a view of a further packaging clean film in accordance with the present invention.

Further packaging clean film and a further packaging pouch will be described with reference to FIG. 11. Referring to FIG. 11, a packaging clean film 1 may be a film having a base structure 4 consisting of a base layer 2, a heat-sealing layer 3 and a conductive ink layer 4a coating the outside surface of the base layer 2, and an inner protective layer 6 laminated to the inside surface of the base structure 4. Since the packaging clean film 1 shown in FIG. 11 is not provided with any film corresponding to the outer protective layer 5, only the inner protective layer 6 is peeled off from the base structure 4 by the peeling rollers 30 of the packaging pouch manufacturing apparatus shown in FIG. 1.

Although the conductive ink layer 4a of each packaging clean film 1 may possibly stick to the inner protective layer 6 when the packaging clean film 1 is wound in a roll on the film feed unit 20, the heat-sealing layer 3 can be kept clean by peeling off the inner protective layer 6 by the peeling rollers 30.

Figure 12:
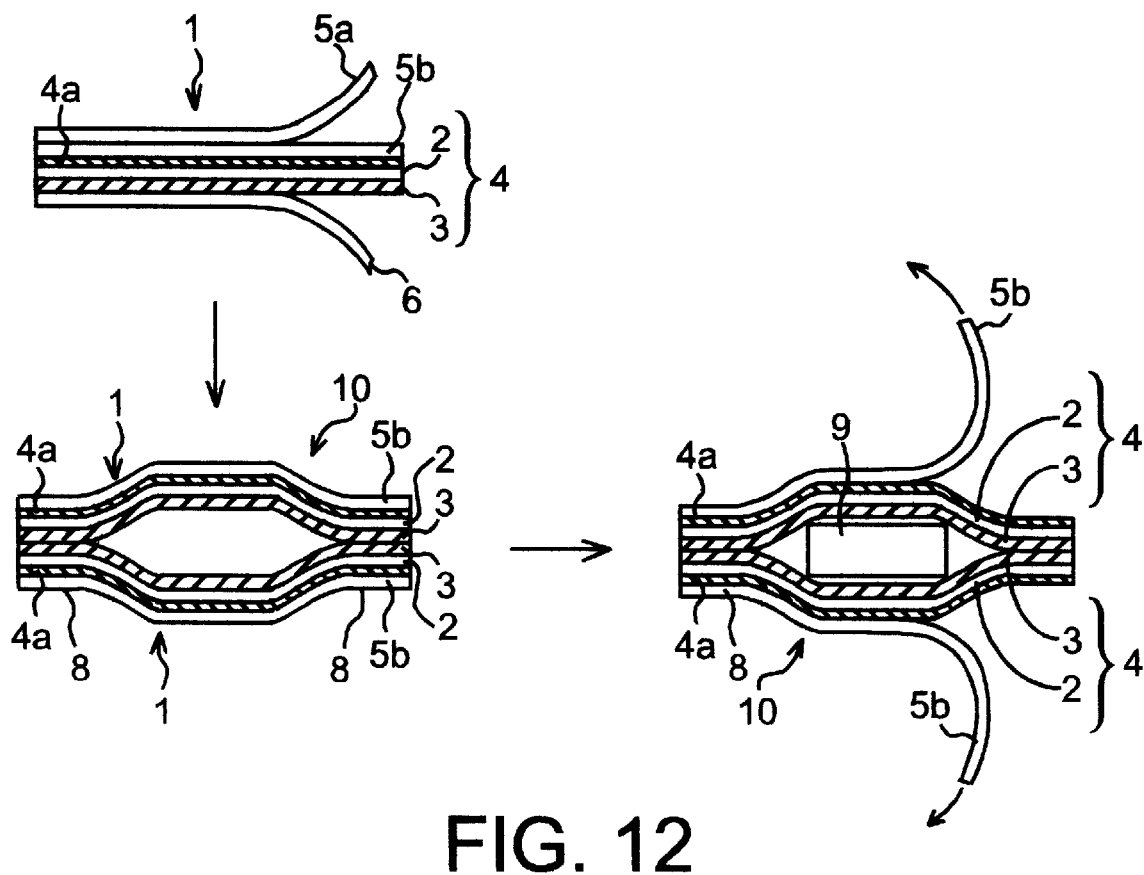
FIG. 12 is a view of a further packaging clean film and a further packaging pouch in accordance with the present invention.

FIG. 12 shows a further example of the present invention. As shown in FIG. 12, a packaging clean film 1 may be a film having a base structure 4 consisting of a base layer 2 and a heat-sealing layer 3, a conductive ink layer 4a coating the outside surface of the base layer 2, a second outer protective layer 5b laminated to the outside surface of the base structure 4, a first outer protective layer 5a laminated to the outside surface of the second outer protective layer 5b, and an inner protective layer 6 laminated to the inside surface of the base structure 4.

When manufacturing packaging pouches 10 by the packaging pouch manufacturing apparatus shown in FIG. 1, the peeling rollers 30 peel off the inner protective layer 6 and the first outer protective layer 5a from each of a pair of packaging clean films 1, and then the pair of packaging clean films 1 are processed to manufacture packaging pouches 10. Articles 9 are put in the packaging pouch 10 thus manufactured through an opening, and then the packaging pouch 10 is sealed. The packaging pouch 10 containing the articles 9 is transported through an ordinary transportation route to a clean room in which semiconductor devices or the like are fabricated. The second outer protective layers 5b are removed from the packaging pouch 10 immediately before carrying the packaging pouch 10 into the clean room, so that the conductive ink layers 4a are exposed on the outside surfaces of the base structures 4.

Figure 13:
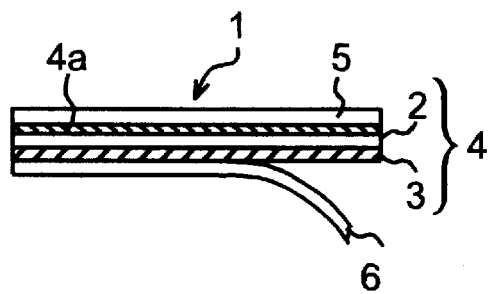
FIG. 13 is a view of a packaging clean film in accordance with the present invention.

FIG. 13 shows a further example of the present invention. Referring to FIG. 13, a packaging clean film 1 has the same laminate structure as that of the packaging clean film 1 shown in FIG. 10 and has a base structure 4 consisting of a base layer 2 and a heat-sealing layer 3, an conductive ink layer 4a coating the outside surface of the base layer 2, an outer protective layer 5 laminated to the outside surface of the base structure 4, and an inner protective layer 6 laminated to the inside surface of the base structure 4. The packaging pouch manufacturing apparatus shown in FIG. 1 peels only the inner protective layer 6 from each of a pair of packaging clean films 1 by the peeling rollers 30 and processes the pair of packaging clean films 1 to form a packaging pouch 10. The outer protective layers 5 remaining on the outside surface of the packaging pouch 10, similarly to those of the example shown in FIG. 10, are removed immediately before carrying the packaging pouch 10 into a clean room and the conductive ink layers 4a are exposed on the outside surfaces of the base structures 4.

Although the foregoing examples employ the base structure having the base layer 2 and the heat-sealing layer 3, the base structure 4 may be only a base layer 2 having a heat-sealing property. The heat-sealing layer that forms the inside surface of the packaging pouch may be formed of a polyethylene resin containing 100 to 1000 ppm surface active agent. The conductive ink layer 4a may be formed on the inside surface of the base structure 4 instead of forming the same on the outside surface of the base structure 4. Since the inside surface of the base structure 4 must have a heat-sealing property, the conductive ink layer 4a is formed of a material having a heat-sealing property when the same is to be formed on the inside surface of the base structure 4.

Concrete examples of the second embodiment will be described hereinafter.

EXAMPLE 1

Example 1 corresponds to the embodiment shown in FIG. 10. A laminated film of a construction expressed by:

Conductive ink 2 $\mu$m/ONy 15 $\mu$m/Anchor coat/LDPE 30 $\mu$m//CPP 50 $\mu$m was formed by coating a surface of a 15 $\mu$m thick oriented nylon film (ONy film) (Santnyl SNW, Mitsubishi Chemical Industries Ltd.) as a primary film, coated with a 2 $\mu$m thick conductive ink layer of a tin oxide conductive ink (P-4, The Inktec) with a 1.0 $\mu$m thick coat of a urethane anchor agent (ADCOAT506X/CAT10, Toyo Morton), and laminating a polypropylene film (Synthetic film 3701T50$\mu$, Toray Industries Inc.) to the ONy film with a low-density polyethylene resin (LDPE resin) (M-11P, Mitsui Sekiyu Kagaku), by extrusion.

Then, a medium-density polyethylene film (MDPE film) (MPA60$\mu$, Dai Nippon Jushi) was laminated with an LDPE resin (M-11P, Mitsui Sekiyu Kagaku) by extrusion to the surface of the oriented nylon film not coated with the anchor agent of the laminated film to produce a laminated packaging clean film of a construction expressed by:

MDPE 60 $\mu$m/LDPE 20 $\mu$m//Conductive ink 2 $\mu$m/ONy 15 $\mu$m/Anchor coat/LDPE 30 $\mu$m//CPP 50 $\mu$m Packaging pouches 10 were formed by processing the laminated films of the foregoing construction and peeling off the MDPE/LDPE composite films and the CPP films while the laminated films were being processed. In the laminated film, the MDPE/LDPE composite film is the outer protective layer 5, the ONy film is the base layer 2, the LDPE film is the heat-sealing layer 3, and the CPP film is the inner protective layer 6.

EXAMPLE 2

Example 2 corresponds to the embodiment shown in FIG. 11. A laminated film of a construction expressed by:

Conductive ink 2 $\mu$m/ONy 15 $\mu$m/Anchor coat/LDPE 30 $\mu$m//CPP 50 $\mu$m was formed by coating a surface of a 15 $\mu$m thick oriented nylon film (ONy film) (Santnyl SNW, Mitsubishi Chemical Industries Ltd.) as a primary film, coated with a 2 $\mu$m thick film of a tin oxide conductive ink (P-4, The Inktec) with a 1.0 $\mu$m thick coat of a urethane anchor agent (ADCOAT506X/CAT10, Toyo Morton), and laminating a polypropylene film (Synthetic film 3701T50$\mu$, Toray Industries Inc.) with a low-density polyethylene resin (LDPE resin) (M-11P, Mitsui Sekiyu Kagaku), to the ONy film by extrusion.

Packaging pouches 10 were formed by processing the laminated films of the foregoing construction and the CPP films were peeled off while the laminated films were being processed. In the laminated film, the film of the tin oxide conductive ink is the conductive ink layer 41, the ONy film is the base layer 2, the LDPE film is the heat-sealing layer 3, and the CPP film is the inner protective layer 6.

EXAMPLE 3

Example 3 corresponds to the embodiment shown in FIG. 12. A laminated film (packaging clean film) of a construction expressed by:

Ny 15 $\mu$m//LDPE 50 $\mu$m/LDPE 20 $\mu$m//Conductive ink 2 $\mu$m/ONy 15 $\mu$m/Anchor coat/LDPE 30 $\mu$m//CPP 50 $\mu$m was formed by forming a two-layer film by coextrusion using a nylon resin (5033B, Ube kosan) and a low-density polyethylene resin (M-16, Mitsui Sekiyu Kagaku), and laminating the laminated film in Example 2 to the two-layer film with the surface of the LDPE layer of the coextruded two-layer film and the surface of the ONy film coated with the conductive ink coat in contact with each other with a film of an LDPE resin (M-11P, Mitsui Sekiyu Kagaku) formed by extrusion.

Packaging pouches were formed by processing the laminated films of the foregoing construction and peeling off the Ny15 $\mu$m films and the CPP films while the laminated films were being processed. In the laminated film, the Ny film is the first outer protective layer 5a, the LDPE/LDPE film is the second outer protective layer 5b, the ONy film is the base layer 2, the LDPE film is the heat-sealing layer 3, and the CPP film is the inner protective layer 6.

EXAMPLE 4

Example 4 corresponds to the embodiment shown in FIG. 13. Packaging pouches 10 were formed by processing the laminated films of the construction in Example 1 and only the CPP films were peeled off while the laminated films were being processed.

According to the present invention, a clean packaging pouch having clean surfaces and coated with conductive ink layers can be obtained. Accordingly, when the packaging pouch containing articles is transported, the conductive ink layers suppress the accumulation of electric charges that attract dust particles and affect the articles contained in the packaging pouch on the surface of the packaging pouch due to frictional electrification.

Third Embodiment

Figure 14:
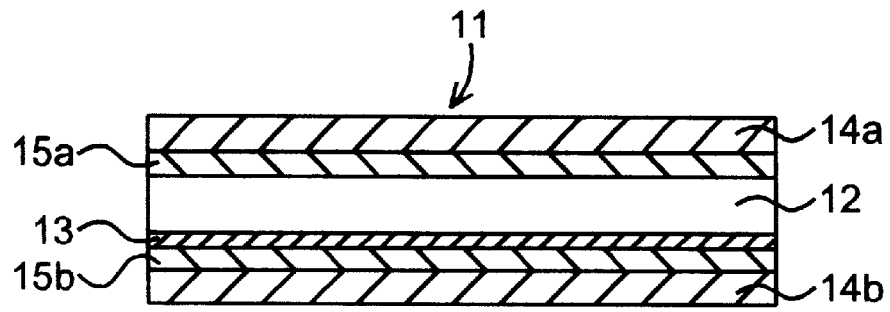
FIG. 14 is a view of a packaging clean film in a third embodiment according to the present invention.
Figure 15:
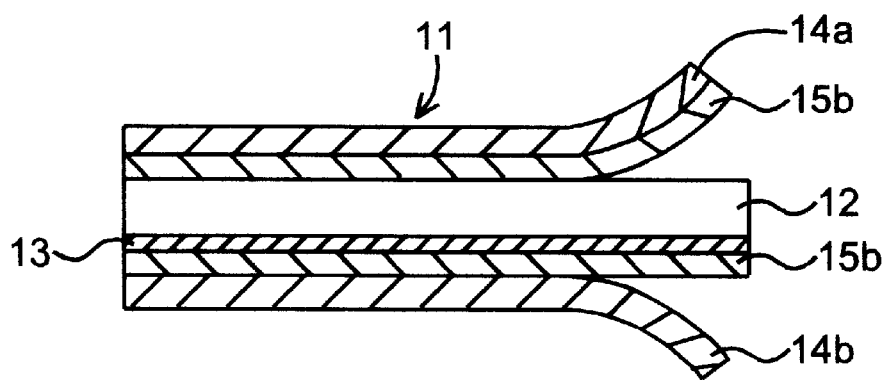
FIG. 15 is a view of the packaging clean film of FIG. 14, showing a state where first and second protective layers are being removed.
Figure 16:
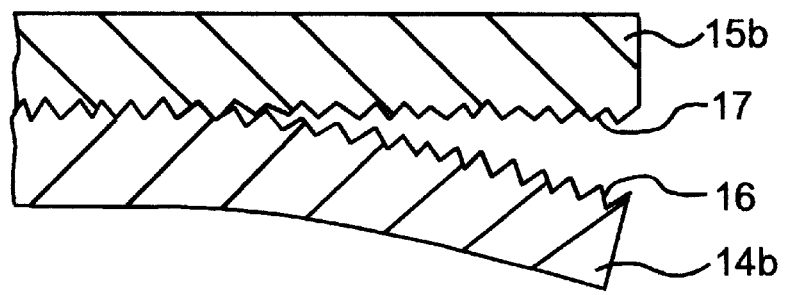
FIG. 16 is a view of a second melt extruded layer and a second protective layer each having a rough surface.

A third embodiment of the present invention will be described with reference to FIGS. 14 to 16 showing packaging clean films and methods of manufacturing such packaging clean films in accordance with the present invention.

Referring to FIG. 14, a packaging clean film 11 comprises a heat-resistant base film 12, a first melt-extruded film 15a laminated to the outside surface of the heat-resistant base film 12, a first protective layer 14a laminated to the first melt-extruded film 15a, an anchor coat 13 formed on the inside surface of the heat-resistant base film 12, a second melt-extruded film 15b formed on the anchor coat 13, and a second protective layer 14b formed on the second melt-extruded film 15b.

Materials of the component films and layers will be described in detail.

Suitable films as the heat-resistant base film 12 are, for example, an oriented nylon film (ONy film), an oriented nylon film with vinylidene chloride film (KON film), a polyethylene terephthalate film (PET film), a polyethylene terephthalate film with vinylidene chloride film (KPET film), a film of a saponified ethylene vinyl acetate (EVOH film), a polyvinylidene chloride film (PVDC film), an aluminum foil, a PET film coated with an inorganic oxide by evaporation, a PET film coated with aluminum by evaporation, and laminated films formed by laminating some of those films by dry lamination. An ONy film and a PET film are particularly preferable. Although the thickness of the heat-resistant base film 12 is dependent on the characteristics of the heat-resistant base film 12, the type of articles to be packaged and the like and it is difficult to specify an appropriate thickness, generally, a preferable thickness is in the range of about 10 to about 30 μm.

There is no particular restriction on the material of the first protective layer 14a and the second protective layer 14b, provided that the protective layers 14a and 14b are not torn when the same are peeled off. The protective layers 14a and 14b may be monolayer films or composite films formed by combining a plurality of films by dry lamination or melt-extrusion. However, in view of ease in the disposal of the peeled protective layers 14a and 14b, suitable materials for forming the protective layers 14a and 14b are polyethylene, polypropylene, polyethylene terephthalate and nylon.

The second protective film 14b is on the side of the inside surface of the packaging pouch. The surface 16 of the second protective layer 14b contiguous with the second melt-extruded film 15b is a rough surface 16 (FIG. 16) having a center line average height Ra of 0.2 μm or above, preferably, 0.5 μm or above so that the surface 17 of the second melt-extruded film 15b is not smooth when the second protective layer 14b is peeled off from the second melt-extruded film 15b. The first protective layer 14a and the second protective layer 14b is made of a resin containing only the least necessary amount of additives to avoid contamination due to the migration of the additives through the interfaces.

The first melt-extruded film 15a and the second melt-extruded film 15b are formed by extruding a molten resin. Although the material of the first melt-extruded film 15a and the second melt-extruded film 15b is dependent on the combination of the first protective layer 14a, the second protective layer 14b and the heat-resistant base film 12 and cannot be independently determined, it is preferable to form at least the second melt-extruded film 15b of a resin not containing any additive because the second melt-extruded film 15b forms the inside surface of the packaging pouch after the second protective layer 14b is removed and it is essential that the second melt-extruded film 15b has a heat-sealing property. For example, low-density polyethylene not containing any additive is a suitable material for forming the first melt-extruded film 14a and the second melt-extruded film 14b.

Although dependent on articles to be sealed in the packaging pouch, generally, the thickness of the second melt-extruded film 15b (heat-sealing layer) is in the range of 20 to 100 μm, preferably, 30 to 80 μm. When it is difficult to form the second melt-extruded film 15b in such a preferable thickness, it is preferable to laminate a film of the same material as that of the second melt-extruded film 15b by dry lamination or melt-extrusion lamination to the surface of the heat-resistant base film 12 on which the second melt-extruded film 15b is to be formed. When the pair of packaging clean films are superposed to form the packaging pouch, the second melt-extruded film 15b serves as a heat-sealing layer.

The anchor coat 13 can be formed by spreading an anchor coat agent over the surface of the heat-resistant base film 12. Suitable anchor agents for forming the anchor coat 13 are, by way of example, polyethylene imine anchor agents, titanate anchor agents, Urethane anchor agents and isocyanate anchor agents. Generally, the thickness of the anchor coat 13 is in the range of about 0.3 to about 3 μm, preferably, 0.5 to 1.5 μm.

A method of manufacturing packaging pouches will be described hereinafter. The anchor coat 13 is formed on the inside surface of the heat-resistant base film 12 by spreading an anchor agent. The first melt-extruded film 15a and the second melt-extruded film 15b are formed on the outside surface of the heat-resistant base film 12 and the anchor coat 13, respectively, by melt-extrusion, and the first protective layer 14a and the second protective layer 14b are laminated to the first melt-extruded film 15a and the second melt-extruded film 15b, respectively. The heat-resistant base film 12 and the first melt-extruded film 15a are bonded together for temporary adhesion, the first melt-extruded film 15a and the first protective layer 14a are bonded together for perfect adhesion, the anchor coat 13 coating the heat-resistant base film 12 and the second melt-extruded film 15b are bonded together for perfect adhesion, and the second melt-extruded film 15b and the second protective layer 14b are bonded together for temporary adhesion. When laminating the second protective layer 14b on the side of the inside surface of the packaging pouch to the second melt-extruded film 15b, the second melt-extruded film 15b is bonded perfectly through the anchor coat 13 to the heat-resistant base film 12, and the second protective layer 14b is bonded temporarily to the second melt-extruded film 15b. Although the first melt-extruded film 15a on the side of the outside surface of the packaging pouch is bonded temporarily to the heat-resistant base film 12, the first melt-extruded film 15a may be bonded perfectly through an anchor coat to the heat-resistant base film 12, and the first protective layer 14a may be bonded temporarily to the first melt-extruded film 15a. In this case, the interface between the first protective layer 14a and the first melt-extruded film 15a is a separating plane. Thus, a packaging clean film 1 as shown in FIG. 14 is fabricated.

The surfaces of the second protective layer 14b and the second melt-extruded film 15b of the packaging clean film 1 sharing the separating plane is sealed and is not exposed to the atmosphere after the packaging clean film 1 has been fabricated and hence is not contaminated by dust particles and other contaminants. A small amount of dust particles adhering to the surface of the second protective layer 14b on the side of the second melt-extruded film 15b is taken into the second melt-extruded film 15b while the second melt-extruded film 15b is in a fluidic state and hence the dust particles will not scatter after the second melt-extruded film 15b has been cooled to solidify. Similarly, the surface of the heat-resistant base film 12 on the side of the first melt-extruded film 15a is clean and dust particles and contaminants will not scatter from the surface of the heat-resistant base film 12 in the separating plane.

When the first protective film 14a, i.e., the outermost layer of the packaging clean film 11, the second melt-extruded film 15a and the second protective layer 14b are removed as shown in FIG. 15, clean surfaces free from dust particles and contaminants and not scattering about dust particles and other contaminants are exposed. Accordingly, the packaging clean film 11 is suitable for packaging articles requiring high cleanliness, such as semiconductor devices.

The surface roughness of the second protective layer 14b is transferred to the surface of the second melt-extruded film 15b. Consequently, when the pair of packaging clean films 11 are superposed after removing the second protective layers 14b to fabricate a packaging pouch, the opposite inside surfaces of the packaging pouch do not stick closely to each other and hence the packaging pouch can be easily opened.

Examples of the present invention will be described hereinafter.

EXAMPLE 1

A 15 μm thick oriented nylon film (ONy film) (Santnyl SNW, Mitsubishi Chemical Industries Ltd.) and a polyester film coated with silicon oxide by evaporation ($SiO_x$ VM PET film) (Techbarrier H, Mitsubishi Chemical Industries Ltd.) are laminated with a two-component urethane adhesive (A515/A50, Takeda Yakuhin) by dry lamination in a manner where the silicon oxide is in touch with the oriented nylon film to obtain the heat-resistant base film 12. Then, the first melt-extruded film 15a of a low-density polyethylene resin (LDPE resin) (M-11, Mitsui Sekiyu Kagaku) is formed by extrusion on the surface of the PET film not coated with any anchor coat, and a medium-density polyethylene film (MDPE film) (MPA, Dai Nippon Jushi) is laminated to the first melt-extruded film 15a to obtain the first protective layer 14a. Then, the 1.0 μm thick anchor coat 13 (AC) was formed by spreading a urethane anchor coat agent (ADCOAT506X/CAT10, Toyo Morton) on the surface of the ONy film of the laminated film. A film of an LDPE resin (M-11P, Mitsui Sekiyu Kagaku) was extruded over the anchor coat 13 and an MDPE film (MPA, Dai Nippon Jushi) was laminated to the surface of the anchor coat 13. Then, an LDPE resin (second molten resin film) (M-11P, Mitsui Sekiyu Kagaku) was extruded over the MDPE film, and a polypropylene film (CPP film) (CPP-M, Dai Nippon Jushi) having a rough surface was laminated to the film of the LDPE resin to obtain a packaging clean film 11 of a construction expressed by:

MDPE 50 μm/LDPE 20 μm/$SiO_x$ VM PET 12 μm/Adhesive layer/ONy 15 μm/Anchor coat/LDPE 20 μm/MDPE 30 μm/LDPE 20 μm/CPP 50 μm The LDPE film and the MDPE film formed on the anchor coat are formed to form a heat-sealing layer of a necessary thickness. The LDPE resin film is the second melt-extruded film 15b, and the polypropylene film is the second protective layer 14b.

The first protective layer 14a, the first melt-extruded film 15a, i.e., the MDPE/LDPE film, and the second protective layer 14b, i.e., the CPP film, were removed, and then the numbers of particles adhering to the exposed surface of the oriented nylon film of the base film 12, and the exposed surface of the second melt-extruded film 15b, i.e., the low-density polyethylene film were measured. Measured results are shown in Table 2. The particles adhering to those surfaces were measured by the following method. A sample packaging clean film was rinsed with filtered dust-free pure water, and particles of particle sizes of 0.5 μm or above contained in the pure water were counted by a liquid-borne particle counter (Rion), and the number of particles was converted into a particle density in a unit of particle/$m^2$.

Flat packaging pouches having three sealed sides were fabricated by processing the packaging clean film 11 after removing the second protective layer 14b, i.e., the CPP film, so that the surface of the packaging clean film 1 exposed after the second protective layer 14b is removed form the inside surface of the flat packaging pouches, and the opening property of the flat packaging pouches was examined.

COMPARATIVE EXAMPLE 1

A laminated film was formed by coating a surface of a 15 μm thick oriented nylon film (ONy film) (Santnyl SNW, Mitsubishi Chemical Industries Ltd.) coated with a polyester film coated with silicon oxide by evaporation ($SiO_x$ VM PET film) (Techbarrier H, Mitsubishi Chemical Industries Ltd.) with a two-component urethane adhesive (A515/A50, Takeda Yakuhin) by dry lamination so as to sandwich the evaporated layer to obtain the heat-resistant base film 12, forming the 1.0 μm thick anchor coat 13 (AC) by spreading a urethane anchor agent (ADCOAT506X/CAT10, Toyo Morton) over the surface of the ONy film. Then, a film of an LDPE resin (M-11P, Mitsui Sekiyu Kagaku) was extruded over the anchor coat 13 and an MDPE film (MPA, Dai Nippon Jushi) was laminated to the surface of the anchor coat 13 to obtain a packaging clean film 11 of a construction expressed by:

$SiO_x$ VM PET 12 μm/ONy 15 μm/Anchor coat/LDPE 20 μm/MDPE 30 μm/LDPE 20 μm

The LDPE film, the MDPE film and the LDPE resin form a heat-sealing layer. The numbers of particles adhering to the surfaces of the oriented nylon film and the low-density polyethylene film were measured.

COMPARATIVE EXAMPLE 2

The construction of a packaging clean film 11 in Comparative example 2 is the same as that of the packaging clean film in Example 1, except that the former employs a CPP film having a smooth surface (P1011, Toyobo) as a second protective layer 14b, which forms the inside surface of a packaging pouch. The packaging clean film 11 in Comparative example 2 has a construction expressed by:

MDPE 50 μm/LDPE 20 μm/$SiO_x$ VM PET 12 μm/Adhesive layer/ONy 15 μm/AC/LDPE 20 μm/MDPE 30 μm/LDPE 20 μm/CPP 50 μm Packaging pouches having three sealed sides were fabricated by processing the packaging clean film 11 after removing the MDPE/LDPE film and the CPP film so that the surface of the packaging clean film on the side of the CPP film form the inside surface of the packaging pouches, and the opening property of the packaging pouches was examined.

Examination of Results

As is obvious from Table 2, the numbers of particles adhering to the exposed surfaces of the packaging clean film 11 in Example 1 are far less than those of particles adhering to the exposed surfaces of the packaging clean film in Comparative example 1. Thus, it was proved that the present invention is capable of providing a packaging clean film having exposed surfaces of an excellent cleanliness.

TABLE 2

| Samples | No. of particles (Particle/m$^2$) | | Opening property |
|---|---|---|---|
| | ONy surface | LDPE surface | |
| Example 1 | 1250 | 1800 | Good |
| Comp. example 1 | 252000 | 348000 | — |
| Comp. example 2 | — | — | Bad |

As shown in Table 2, the inside surfaces facing each other of the packaging pouch formed by processing the packaging clean film in Example 1 having the second protective layer having a rough surface did not stick to each other and the packaging pouch could be easily opened. On the other hand, the inside surfaces facing each other of the packaging pouch formed by processing the packaging clean film in Comparative example 2 having the second protective layer having a smooth surface stuck to each other and the packaging pouch could not be easily opened. Thus, it was proved that the present invention is capable of providing a packaging clean film 11 that forms packaging pouches that can be easily opened.

EXAMPLE 2

A packaging clean film in Example 2 may be a laminated film formed by laminating a first protective layer 14a forming an outside surface and consisting of a biaxial oriented polyester film (PET film) and an LDPE film, a first melt-extruded film 15a of an LDPE, a heat-resistant base film 12 consisting of a biaxial oriented nylon film (ONy) and a polyester film evaporation-coated with silicon oxide (SiO$_x$ VMPET), an anchor coat 13, a second melt-extruded film 15b of an LDPE, and a CPP film serving as a second protective layer 14b forming an inside surface. The construction of the packaging clean film is expressed by:

PET 16 μm/LDPE 40 μm/Extruded PE 20 μm/ONy 15 μm/SiO$_x$ VMPET 12 μm/Anchor coat/Extruded PE 60 μm/CPP 50 μm The first protective layer 14a and the heat-resistant base film 12 of the packaging clean film in Example 2 have multilayer constructions, respectively.

As is apparent from the foregoing description, the present invention is capable of efficiently manufacturing packaging clean films free from dust particles and other contaminants.

Fourth Embodiment

A fourth embodiment of the present invention will be described with reference to FIGS. 17 to 24. First, an outline of the fourth embodiment will be given. The present invention has been made on the basis of a fact that a very clean package can be obtained by packaging articles to which dust particles and other contaminants are extremely detrimental, such as electronic devices, in a multilayer laminated sheet manufactured by a usual laminating process, such as an extrusion laminating process, a dry laminating process, a coextrusion laminating process, a T-die extrusion molding process or an inflation coextrusion molding process, and coated with an antistatic layer after removing one or two layers of the multilayer laminated sheet.

Figure 17:
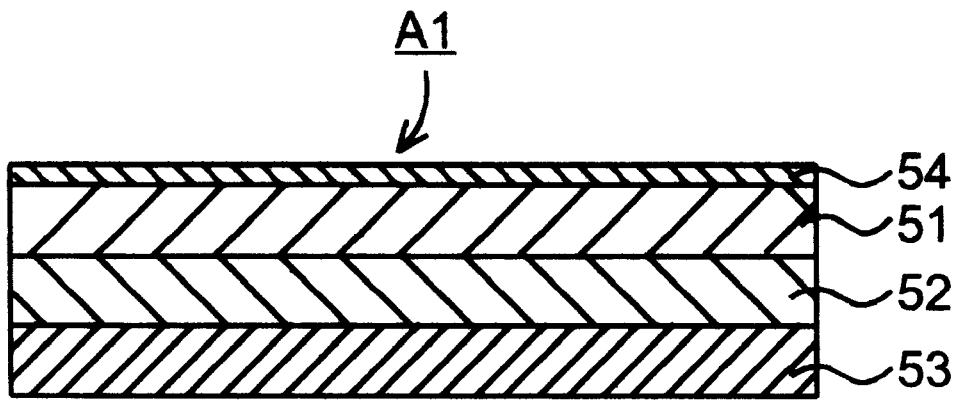
FIG. 17 is a schematic sectional view of a packaging clean film in a fourth embodiment according to the present invention.

Referring to FIG. 17, a packaging clean film A$_1$ in the fourth embodiment is formed by sequentially laminating a base layer 51, a heat-sealing layer 52 and a first protective layer 53, and coating the exposed surface of the base layer 51 with an antistatic layer 54. In use, the first protective layer 53 is peeled off from the packaging clean film A$_1$ to expose the clean surface of the heat-sealing layer 52.

Figure 18:
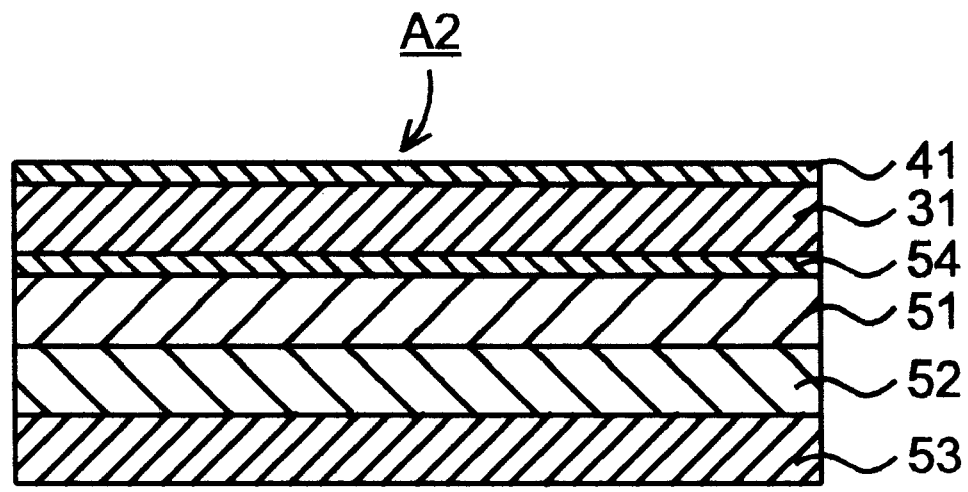
FIG. 18 is a schematic sectional view of a further packaging clean film in accordance with the present invention.

Referring to FIG. 18, another packaging clean film A$_2$ in the fourth embodiment is formed by sequentially laminating a second protective layer 31 having an outside surface coated with an antistatic layer 41, a base layer 51 having an outside surface coated with an antistatic layer 54, a heat-sealing film 52 and a first protective layer 53. In use the first protective layer 53 and the second protective layer 31 are peeled off from the packaging clean film A$_2$ to expose the clean surfaces of the base layer 51 and the heat-sealing layer 52.

Packaging pouches B$_1$ and B$_2$ in the fourth embodiment are fabricated by processing the packaging clean films A$_1$ and A$_2$.

In the fourth embodiment, a multilayer laminated sheet is manufactured by a usual laminating process, such as an extrusion laminating process, a dry laminating process, a coextrusion laminating process, a T-die extrusion molding process or an inflation coextrusion molding process. Dust and contaminous particles existing between the component films 31, 41, 51, 52, 53 and 54 of the laminated sheet are caught in the molten materials of the component films or in adhesives for laminating the component films when laminating the films. Therefore, when one or two component films of the laminated sheet are removed, clean, dust-free surfaces are exposed to provide a packaging clean film.

In the fourth embodiment, the antistatic layer of the laminated sheet prevents the detrimental effect of static electricity and the like on articles packaged in the laminated sheet in the fourth embodiment.

Further details of the fourth embodiment will be described hereinafter.

The materials of the base layer 51, the heat-sealing layer 52, the first protective layer 53 and the second protective layer 31 in the fourth embodiment will be explained. These films may be films or sheets of known resins including polyolefine resins, such as those of low-density polyethylene, medium-density polyethylene, high-density polyethylene, linear low-density polyethylene, polypropylene, ethylene-propylene copolymer, ethylene-vinyl acetate copolymer, an ionomer, an ethylene-ethyl acrylate copolymer, an ethylene acrylate copolymer, a methylpentene polymer and a polybutylene polymer, polyvinyl chloride resins, polyvinylidene chloride resins, polystyrene resins, polyacrylic resins, polyacrylonitrile resins, polyester resins, polyamide resins, polyurethane resins, polyaminoplast resins, such as urea-formaldehyde resins or melamine resins, alkyd resins, unsaturated polyester resins, diarylphthalate resins, phenol-formaldehyde resins, epoxy resins, polyimide resins, polycarbonate resins, polyvinyl alcohol resins, saponified ethylene vinyl acetate copolymers, fluorocarbon resins, vinylon resins and polyacetal resins.

In the fourth embodiment, the film or the sheet may be of a nonoriented type, a uniaxial oriented type or a biaxial oriented type.

Preferable thickness of the film or the sheet in in the range of about 5 to about 300 μm.

The fourth embodiment may use films or sheets of materials other than the foregoing materials, such as cellophane and synthetic paper, metal foils, such as aluminum foils, films coated with a metal film by evaporation, and films coated with an oxide, such as silicon dioxide, by evaporation.

In the fourth embodiment, it is preferable to form the base layer 51 of a material having, for example, sufficient strength, a weatherproof property and heat-resistant property because the base layer 51 serves as a fundamental functional component of a packaging material. Preferable films or sheets for use as the base layer 51 are those of polypropylene resins, polyester resins, polyamide resins and polycarbonate resins among the foregoing possible materials.

The heat-sealing layers 52 of two packaging clean films are placed in contact with each other and heat is applied to the heat-sealing layers 52 to form sealed edge portions in fabricating a packaging pouch. Therefore, materials suitable for forming the heat-sealing layer 52 are those having a heat-sealing property among the foregoing possible materials. Suitable materials for forming the heat-sealing layer 52 are, for example, resins of low-density polyethylene, medium-density polyethylene, high-density polyethylene, linear low-density polyethylene, polypropylene, an ethylene-propylene copolymer, an ethylene-vinyl acetate copolymer, an ionomer, an ethylene-ethyl acrylate copolymer, an ethylene acrylate copolymer, polyolefine resins, such as a methylpentene polymer and a polybutylene polymer, polyvinyl chloride resins, polystyrene resins, polyacrylic resins and polyacrylonitrile resins.

The first protective layer 53 and the second protective layer 31 in the fourth embodiment protect the surface of the base layer 51 and the heat-sealing layer 52 from dust particles and other contaminants and are peeled off when fabricating packaging pouches to expose the clean surfaces of the base layer 51 and the heat-sealing layer 52. Therefore, the protective layers 53 and 31 may be films or sheets selected out of the foregoing films or sheets.

Particularly, in the fourth embodiment, it is basically desirable that the protective layers 53 and 31 are films or sheets capable of being peeled off from the base layer or the heat-sealing layer among the foregoing films or sheets. It is desirable to use films somewhat adhesive to each other, not having affinity and compatibility to each other in combination. When necessary, a separation layer is formed between the adjacent films. Such a separation layer may be a film of a composite material consisting of one of the foregoing resins as a vehicle, and additives such as a plasticizer, a surface active agent, stearate, polyethylene wax, a metallic soap, a lubricant, such as a fatty acid amide and/or other additives.

The antistatic layers 41 and 54 in the fourth embodiment reduce static charges that damage, for example, electronic devices, such as IC devices. More concretely, the antistatic layers 41 and 54 may be films of an antistatic surface active agent or an antistatic siloxane agent, metal thin films, such as an evaporated films or metal foils, films of a composite material prepared by adding at least one of metal powder, an inorganic substance, such as carbon, a silicon compound, and an antistatic agent, such as a surface active agent, and optional additives to the aforesaid resin as a vehicle, or molded films.

Packaging clean films in the fourth embodiment manufactured from those materials will be described hereinafter with reference to FIGS. 17 to 20 showing some examples of the packaging clean films in schematic sectional views.

FIG. 17 shows a packaging clean film $A_1$ formed by sequentially laminating a base layer 51 having an outside surface coated with an antistatic layer 54, a heat-sealing layer 52 and a protective layer 53. When the first protective layer 53 is peeled off, a clean surface of the heat-sealing layer 52 is exposed.

FIG. 18 shows a packaging clean film $A_2$ formed by sequentially laminating a second protective layer having an outside surface coated with an antistatic layer 41, a base layer 51 having an outside surface coated with an antistatic layer 54, a heat-sealing layer 52 and a first protective layer 53. When the first protective layer 53 and the second protective layer 31 are peeled off, clean surfaces of the base layer 51 and the heat-sealing layer 52 are exposed.

Figure 19:
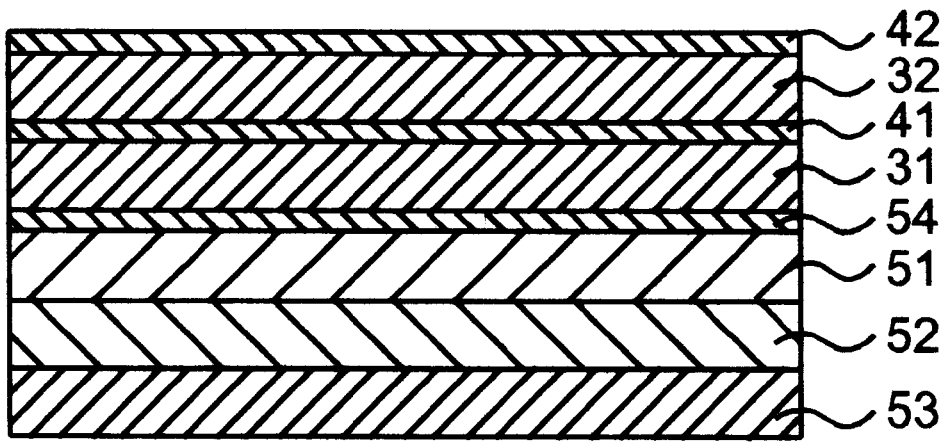
FIG. 19 is a schematic sectional view of a further packaging clean film in accordance with the present invention.

FIG. 19 shows a packaging clean film $A_3$ having an outer protective layer of a multilayer construction. More concretely, the packaging clean film $A_3$ is formed by sequentially laminating a third protective layer 32 having an outside surface coated with an antistatic layer 42, a second protective layer 31 having an outside surface coated with ah antistatic layer 41, a base layer 51 having an outside surface coated with an antistatic layer 54, a heat-sealing layer 52 and a first protective layer 53. When the first protective layer 53, the second protective layer 31 and the third protective layer 32 are peeled off, clean surfaces of the base layer 51 and the heat-sealing layer 52 are exposed.

Figure 20:
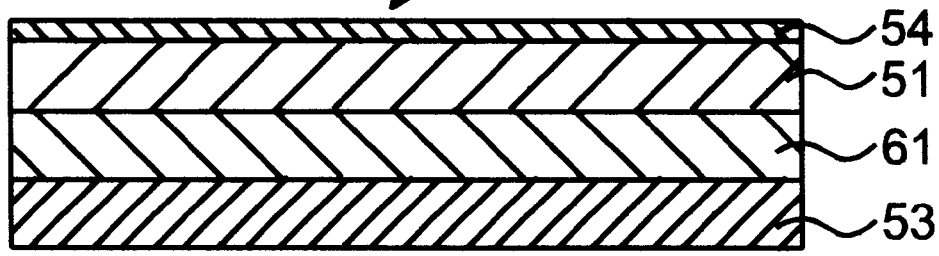
FIG. 20 is a schematic sectional view of a further packaging clean film in accordance with the present invention.

FIG. 20 shows a packaging clean film $A_4$ having a heat-sealing layer containing a antistatic agent. More concretely, the packaging clean film $A_4$ is formed by sequentially laminating a base layer 51 having an outside surface coated with an antistatic layer 54, a heat-sealing layer 61 and a first protective layer 53. When the first protective layer 53 is peeled off, a clean surface of the heat-sealing layer 61 is exposed.

Naturally, the heat-sealing layers of the packaging clean films in the fourth embodiment shown in FIGS. 18 and 19 may contain an antistatic agent.

The packaging clean films shown in FIGS. 17 to 20 are only examples and the fourth embodiment is not limited thereto.

A method of manufacturing the foregoing packaging clean films in the fourth embodiment will be described hereinafter.

The base layer 51, the heat-sealing layer 52 and the first protective layer 53 are laminated using the aforesaid resins by a usual laminating process, such as an extrusion laminating process, a dry laminating process (include a solventless laminating process a wax hot-melt laminating process), a wet laminating process, a coextrusion laminating process, a T-die extrusion molding process or an inflation coextrusion molding process, or a usual coating process, such as a roll coating process, a spray coating process, a gravure roll coating process, a flow coating process, a reverse roll coating process or an extrusion coating process. These processes may be applied individually or in combination.

Possible adhesives for laminating those films are laminating AC agents including an organic titanium AC agent, an isocyanate AC agent (urethane anchor agent) and a polyethylene imine AC agent, a polyurethane adhesive, a polyester adhesive, an epoxy adhesive, an acrylic adhesive, a wax adhesive, a water-soluble adhesive containing starch, casein or polyvinyl alcohol as a principal component, and emulsion adhesive including a polyvinyl acetate emulsion and an acrylic emulsion, and an ultraviolet-setting or electron-beam-setting solventless adhesive.

The fourth embodiment may use various additives for lamination in addition to the aforesaid resins as principal materials. For example, a plasticizer, a stabilizer, an oxidation inhibitor, light stabilizer, a coloring material, antistatic agent, a lubricant, a filler and/or other agents may be optionally added to the aforesaid resins.

A method of forming the antistatic layer over the base layer, 51, the first protective layer 53 or the second protective layer will be described hereinafter. As mentioned above, the antistatic layer of the fourth embodiment may be formed of a composite material prepared by mixing a surface active antistatic agent or a siloxane antistatic agent, aforesaid resin as a vehicle, one or some of metal powder, an inorganic substance, such as carbon, a silicon compound and an antistatic agent, such as a surface active agent, and other optional additives by the laminating process or the coating process.

The antistatic layer may be a metal film formed by evaporation of plating or may be a metal foil.

A heat-sealing layer containing an antistatic agent to be used as the heat-sealing layer 52 in the fourth embodiment may be formed, for example, of a composite material prepared by mixing the aforesaid resin for forming the heat-sealing layer 52 as a principal component, one or some of metal powder, an inorganic substance, such as carbon, a silicon compound and an antistatic agent, such as a surface active agent, and other optional additives by the laminating process or the coating process.

Figure 21:
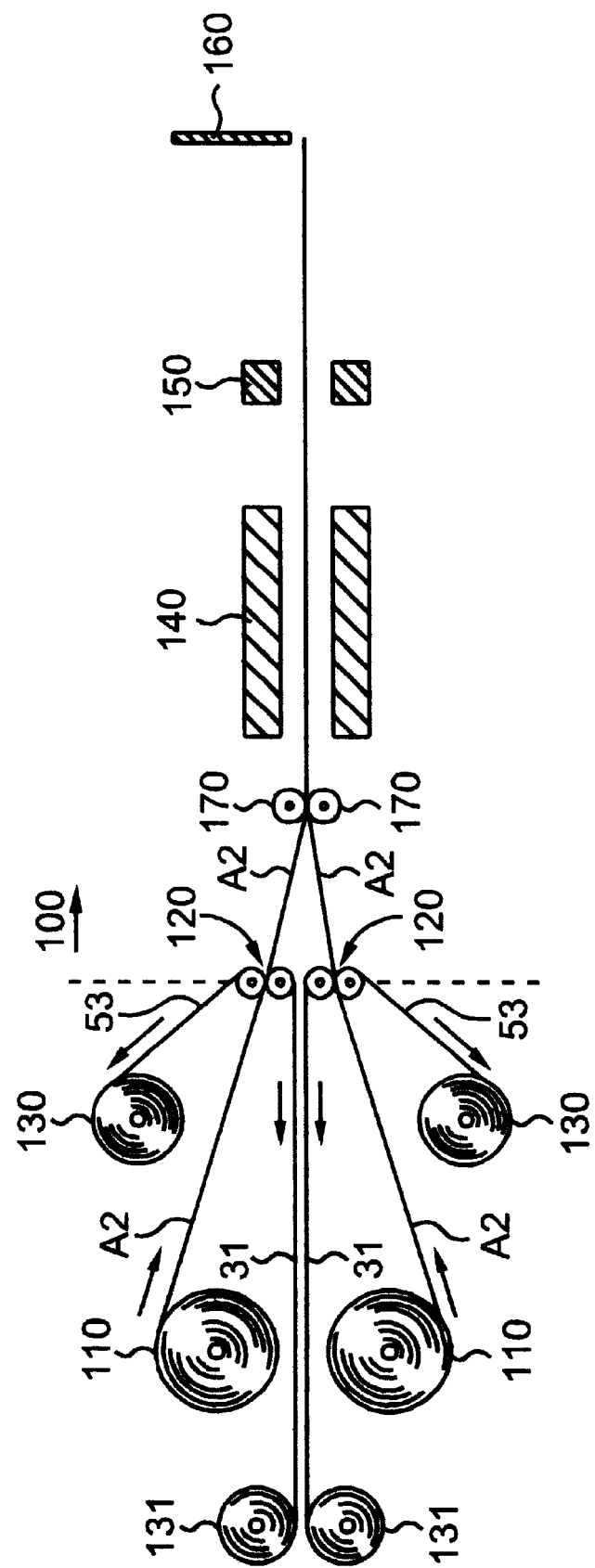
FIG. 21 is a schematic sectional view of a packaging pouch manufacturing apparatus by way of example.

A packaging pouch manufacturing method in the fourth embodiment that processes the packaging clean films thus manufactured to manufacture packaging pouches will be described hereinafter with reference to FIG. 21 showing a packaging pouch manufacturing apparatus for manufacturing packaging pouches, in the fourth embodiment in a schematic sectional view.

Referring to FIG. 21, the packaging pouch manufacturing apparatus has a clean chamber 100 maintained in an environment substantially equivalent to a Class 100 environment (0.5 $\mu$m) and at a positive pressure. A pair of film feed units 110 storing rolls each of the packaging clean film $A_2$ shown in FIG. 18, by way of example, are disposed before the clean chamber 100 with respect to a film feed direction.

Figure 22:
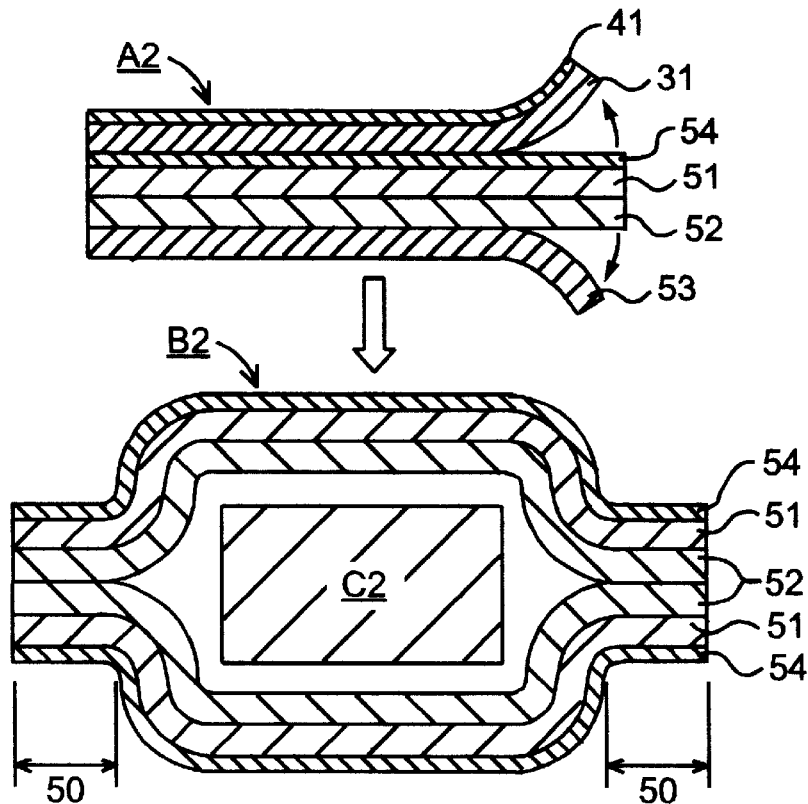
FIG. 22 is a schematic sectional view of a packaging pouch fabricated by processing the packaging clean film of FIG. 18.

FIG. 22 shows a packaging pouch $B_2$ formed by processing the packaging clean films $A_2$ in a schematic sectional view. As shown in FIG. 22, the packaging clean film $A_2$ is formed by sequentially laminating the antistatic layer 41, the second protective layer 31, the antistatic layer 54, the base layer 51, the heat-sealing layer 52 and the first protective layer 53. When the first protective layer 53 and the second protective layer 31 coated with the antistatic layer 41 are peeled off, clean surfaces of the base layer 51 coated with the antistatic layer 54, and the heat-sealing layer 52 are exposed. Peeling rollers 120 are disposed at the inlet of the clean chamber 100 to peel off the second protective layers 31 coated with the antistatic layer 41, and the first protective layers 53 from the pair of packaging clean films $A_2$. The second protective layers 31 coated with the antistatic layer 41, and the first protective layers 53 peeled off from the packaging clean films $A_2$ are taken up by winding roller 21 and an inner protective layer winding rollers 130 and 131 disposed outside the clean chamber 100, respectively.

Disposed behind the peeling rollers 120 in the clean chamber 100 are pressure rollers 170 for pressing together the pair of packaging clean films $A_2$ superposed at the peeling rollers 120. Sequentially disposed behind the pressure rollers 170 are a longitudinal sealing unit 140 for sealing the opposite side edge portions of the pair of packaging clean films $A_2$ along the traveling direction of the packaging clean films $A_2$, a transverse sealing unit 150 for sealing the pair of packaging clean films $A_2$ along the width of the same, and a cutting unit 160 for cutting the pair of packaging clean films $A_2$ along the width of the same.

A packaging pouch manufacturing process will be described hereinafter. A pair of packaging clean films $A_2$ shown in FIG. 22 are fed from the pair of film feed units 110 to the peeling rollers 120. The peeling rollers 120 peel off the outer protective layers 5 and the second protective layers 31 coated with the antistatic layer 41, and the first protective layers 53 from the pair of packaging clean films $A_2$. The first protective layers 53 and the second protective layers 31 peeled off from the pair of packaging clean films $A_2$ by the winding rollers 130 and 131, respectively. The peeling rollers 120 superpose the pair of packaging clean films $A_2$ after peeling off the protective layers 53 and 31, and then feed the superposed packaging clean films $A_2$ into the clean chamber 100. The pressure rollers 170 press together the pair of packaging clean films $A_2$, the longitudinal sealing unit 140 seals the opposite side edge portions of the pair of packaging clean films $A_2$ along the traveling direction of the packaging clean films $A_2$ to form longitudinal sealed edge portions 50, and the transverse sealing unit 150 seals the pair of packaging clean films $A_2$ along the width of the same to form transverse sealed edge portions 50. Then the cutting unit 160 cuts the pair of packaging clean films $A_2$ along the width of the same at longitudinal intervals corresponding to the length of a packaging pouch to obtain a packaging pouch $B_2$ having one open side and three sealed edge portions 50 on its three sides.

The longitudinal sealed edge portions 50 and the transverse sealed edge portions 50 may be formed in the packaging clean films $A_2$ by the longitudinal sealing unit 140 and the transverse sealing unit 150, and the packaging clean films $A_2$ may be transversely cut along the transverse center line of each transverse sealed edge portion 50 by the cutting unit 160 to obtain sealed packaging pouches having four sealed edge portions 50 on its four sides. When putting articles in this sealed packaging pouch, one of the sealed edge portions 50 is cut off to form an opening. The pair of packaging clean films $A_2$ may be sealed in any one of known sealed shapes including a flat shape, a gussetlike shape, an abutted shape and an envelopelike shape.

Since the packaging pouch $B_2$ thus obtained is formed by combining the pair of packaging clean films $A_2$ from which the protective layers are removed immediately before the clean chamber 100, both the surfaces of the base layer and the heat-sealing layer of the packaging pouch $B_2$ are clean.

The packaging pouches $B_2$ thus formed are collected and packed in a large clean bag for shipment. The user uses the packaging pouches $B_2$ for packaging articles $C_2$, such as semiconductor devices including IC devices and LSI circuit devices.

The packaging pouch $B_2$ is sealed after packaging articles $C_2$ therein and the packaging pouch $B_2$ containing the articles $C_2$ is transported. In some cases, static electricity is generated during the transportation of the packaging pouch $B_2$ containing the articles $C_2$ due to movement of the articles $C_2$ in the packaging pouch $B_2$. However, since the heat-sealing layer containing an antistatic agent dissipates electric charges and the antistatic layer coating the base layer 51 suppresses the attraction of dust particles to the surface of the packaging pouch. Accordingly, the articles $C_2$ contained in the pouch $B_2$ are not affected by static electricity.

The foregoing packaging pouch manufacturing process in this example peels off the second protective layers 31 coated with the antistatic layer 41, and the first protective layers 53 from the pair of packaging clean films $A_2$ shown in FIG. 18, superposes the pair of packaging clean films $A_2$ after the protective layers 53 and 31 have been removed, feeds the superposed packaging clean films $A_2$ into the clean changer 100, and processes the superposed packaging clean films $A_2$ to manufacture the packaging pouches $B_2$.

Another packaging pouch manufacturing process in the fourth embodiment may manufacture a packaging pouch $B_2$ having one open side and three sealed edge portions 50 on its three sides, and the second protective layer 31 coated with the antistatic layer 41. This packaging pouch manufacturing process peels off only the first protective layers 53 from a pair of packaging clean films $A_2$ shown in FIG. 18 to expose only clean surfaces of the heat-sealing layers 52, superposes the pair of packaging clean films $A_2$ carrying the second protective layers 31 coated with the antistatic layer 41 with the heat-sealing layers 52 extended so as to face each other, feeds the superposed packaging clean films $A_2$ into the clean chamber 100, forms the longitudinal sealed edge portions 50 and the transverse sealed edge portions 50 by the same method, and cuts the packaging clean films $A_2$ at longitudinal intervals corresponding to the length of the packaging pouch $B_2$.

The packaging pouches $B_2$ thus manufactured are collected and packed in a large bag for shipment. The user uses the packaging pouches $B_2$ for packaging articles $C_2$, such as semiconductor devices including IC devices and LSI circuit devices. The open side of the packaging pouch $B_2$ is sealed to after putting the articles $C_2$ in the packaging pouch $B_2$ to provide a package having the second protective layers 31. The packages thus provided are delivered to users by a distribution system. The second protective layers 31 coated with the antistatic layer 41 are removed from the packages before the packages are carried into a clean room and the packages are opened to take out the articles. Since the thus exposed surfaces of the packages are clean, the packages may be directly carried into the clean room.

The packaging pouch manufacturing process and the article packaging process for producing the packages may be continuously carried out.

A packaging bag in another example in accordance with the fourth embodiment will be described hereinafter, in which the packaging bag manufacturing apparatus of FIG. 21 and the packaging clean films $A_1$ shown in FIG. 17 are used.

Figure 23:
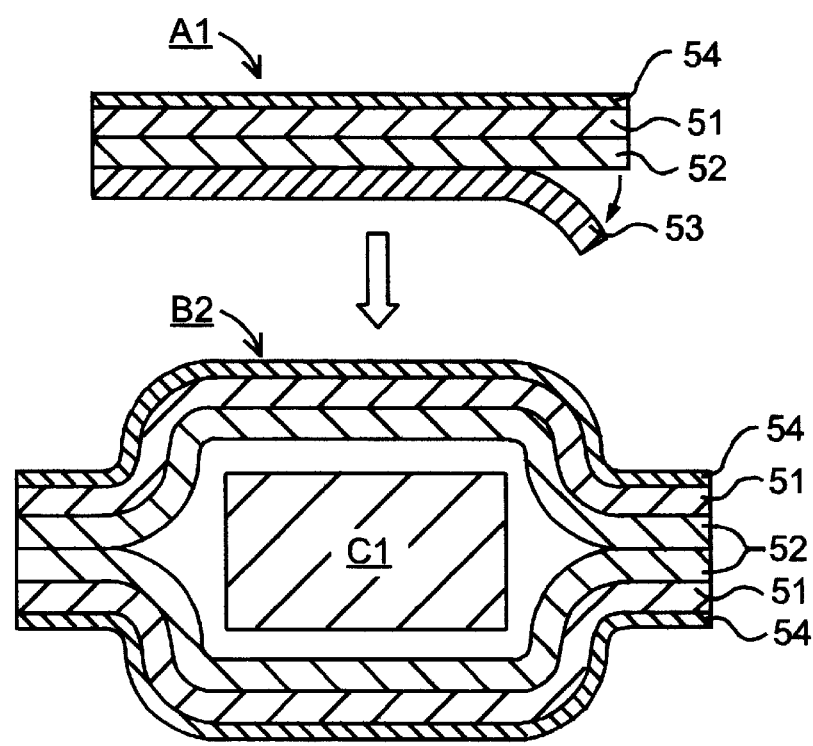
FIG. 23 is a schematic sectional view of a packaging pouch fabricated by processing the packaging clean film of FIG. 17.

Referring to FIG. 23 showing a packaging pouch $B_1$ formed by processing the packaging clean films $A_1$ in a schematic sectional view, each packaging clean film $A_1$ is formed by sequentially laminating the antistatic layer 54, the base layer 51, the heat-sealing layer 52, and the first protective layer 53. The first protective layer 53 is peeled off from the packaging clean film $A_1$ to expose a clean surface of the heat-sealing layer 52. When manufacturing packaging pouches $B_1$, only the first protective layers 53 are peeled off from the packaging clean films $A_1$ by the peeling rollers 120.

Since the clean heat-sealing layers 52 form the inside surfaces of the packaging pouches $B_1$, the articles $C_1$ packed in the packaging pouches $B_1$ are protected from dust particles and other contaminants. Since the base layer 51 is coated with the antistatic layer 54, static electricity generated in the packaging pouch $B_1$ can be dissipated through the packaging pouch $B_1$, so that the articles $C_1$ are not affected by static electricity.

A further packaging pouch in the fourth embodiment will be described hereinafter. This packaging pouch is manufactured by using the packaging pouch manufacturing apparatus shown in FIG. 21 and the packaging clean films $A_3$ shown in FIG. 19.

Figure 24:
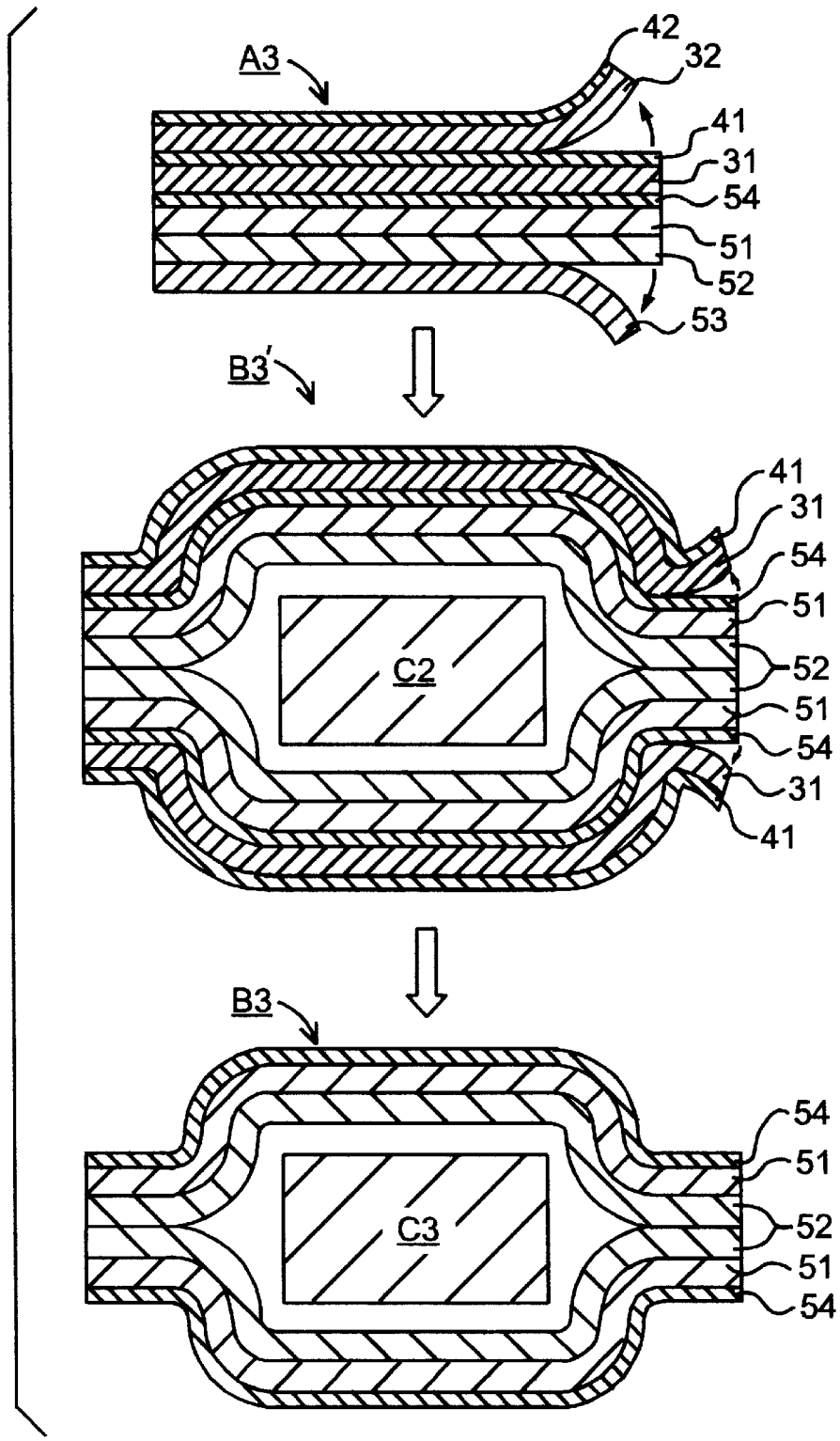
FIG. 24 is a schematic sectional view of a packaging pouch fabricated by processing the packaging clean film of FIG. 19.

Referring to FIG. 24 showing a packaging pouch $B_3$ formed by processing the packaging clean films $A_3$ in a schematic sectional view, each packaging clean film $A_3$ is formed by sequentially laminating the antistatic layer 42, the third protective layer 32, the antistatic layer 41, the second protective layer 31, the antistatic layer 54, the base layer 51, the heat-sealing layer 52 and the first protective layer 53. The second protective layer 31 coated with the antistatic layer 41, the third protective layer 32 coated with the antistatic layer 42, and the first protective layer 53 are peeled off from the packaging clean film $A_3$ to expose clean surfaces of the base layer 51 coated with the antistatic layer 54, and the heat-sealing layer 52.

When manufacturing packaging pouches $B_3$ by processing a pair of packaging clean films $A_3$, the third protective layers 32 coated with the antistatic layer 42, and the first protective layers 53 are removed to expose clean surfaces of the second protective layers 31 coated with the antistatic layer 41, and the heat-sealing layers 52, and then the packaging clean film $A_3$ are processed to manufacture packaging pouches $B_3'$. Articles $C_3$ are put through an opening in the packaging pouch $B_3'$ and the opening is sealed to provide a package. The packages thus produced are through an ordinary transportation route to a clean room in which semiconductor devices are fabricated, and the second protective layers 31 coated with the antistatic layer 41 are removed immediately before the packages are carried into the clean room so that the package has a packaging pouch $B_3$.

Since each of the foregoing packaging pouches in the fourth embodiment has the base layers 51 coated with the antistatic layer 54, and the heat-sealing layer 52 may contain an antistatic agent, electrification due to friction between the packages and between the packaging pouches and their contents can be suppressed, so that dust particles will not adhere to the packages and the contents may not be affected by static electricity. Static electricity generated when the second protective layers 31 are removed can be quickly dissipated.

The foregoing packaging clean films and packaging pouches are only examples and the fourth embodiment is not limited thereto.

Concrete examples of the fourth embodiment will be described hereinafter.

EXAMPLE 1

One of the surfaces of a 12 μm thick polyester film was coated with a composite material containing a high-polymer surface active agent, the other surface of the polyester film was coated with an adhesive film of a polyether urethane adhesive, and a polyester film coated with a 12 μm thick evaporated silicon oxide film was laminated to the former polyester film with the evaporated silicon oxide film in contact with the adhesive film by dry lamination. Then, one surface of the polyester film having the other surface coated with the evaporated silicon oxide film was coated with an anchor agent, and a 60 μm thick nonoriented polypropylene film of a low-density polyethylene resin containing 0.5% by weight nonionic surface active agent was laminated to the polyester film having the evaporated silicon oxide film by extrusion lamination. Then, a medium-density polyethylene film was laminated with a low-density polyethylene resin to the surface of the 12 μm thick polyester film coated with the composite material containing a high-polymer surface active agent by extrusion lamination without using any anchor agent. Then, the surface of the medium-density polyethylene film laminated to the 12 μm thick polyester film was coated with a composite material containing an ampholytic surface active agent to obtain a packaging clean film of a construction expressed by:

Antistatic film 0.3 μm/Medium-density polyethylene film 60 μm/Low-density polyethylene film 20 μm/Antistatic film 0.5 μm/Polyester film 12 Adhesive film 5 μm/Polyester film 12 μm with evaporated silicon oxide/ Anchor agent 0.5 μm/Low-density polyethylene film 40 μm/Nonoriented polypropylene film 60 μm The nonoriented polypropylene films of the packaging clean films were removed in a clean room and packaging pouches having inside surfaces defined by the thus exposed surfaces of the packaging clean films were manufactured.

EXAMPLE 2

One surface of a 12 μm thick polyester film was coated with a film of a composite material containing a high-polymer surface active agent obtained through the graft-copolymerization of an acrylic entity and a surface active agent, the other surface of the 12 μm thick polyester film was coated with a film of an anchor agent, and a 60 μm thick nonoriented polypropylene film of a low-density polyethylene resin was laminated to the 12 μm thick polyester film. Then, a medium-density polyethylene film was laminated with a low-density polyethylene resin to the surface of the 12 μm thick polyester film coated with the composite material containing a high-polymer surface active agent by extrusion lamination without using any anchor agent. Then, the surface of the medium-density polyethylene film laminated to the 12 μm thick polyester film was coated with a composite material containing a cationic surface active agent to obtain a packaging clean film of a construction expressed by:

Antistatic film 0.3 Medium-density polyethylene film 60 μm/Low-density polyethylene film 20 μm/Antistatic film 0.5 μm/Polyester film 12 μm/Anchor agent 0.8 μm/Low-density polyethylene film 50 μm/Nonoriented polypropylene film 60 μm The nonoriented polypropylene films of the packaging clean films were removed in a clean room and packaging pouches having inside surfaces defined by the thus exposed surfaces of the packaging clean films were manufactured.

Comparative Example

One surface of a 12 μm thick polyester film was coated with an anchor agent, and a 60 μm thick medium-density polyethylene film was laminated with a low-density polyethylene resin to the 12 μm thick polyester film. Then, a 60 μm thick medium-density polyethylene film was laminated with a low-density polyethylene resin to the other surface of the 12 μm thick polyester film by extrusion without coating the same surface with any anchor agent to obtain a packaging clean film of a construction expressed by:

Medium-density polyethylene film 60 μm/Low-density polyethylene film 20 μm/Polyester film 12 μm/Anchor agent 0.8 μm/Low-density polyethylene film 50 μm/Nonoriented polypropylene film 60 μm The nonoriented polypropylene films of the packaging clean films were removed in a clean room and packaging pouches having inside surfaces defined by the thus exposed surfaces of the packaging clean films were manufactured.

Experiment 1

Hard disk cases each containing a plurality of hard disks were put in the packaging pouches in Examples 1 and 2 and Comparative example 1, the air contained in the packaging pouches was replaced with clean nitrogen gas, and then the openings of the packaging pouches were heat-sealed while the nitrogen gas was exhausted from the packaging pouches to obtain vacuum-packaged hard disk packages. Then, the outer protective layers were removed from the hard disk packages while the voltages of the surfaces of the hard disk packages and the removed protective layers were measured. The experiment was conducted in an atmosphere of 25° C. and 50% RH. Measured voltages (kV) of the packages and the removed protective layers are shown in Tables 3 and 4, respectively.

TABLE 3

| Time after removal (sec) | 0 | 5 | 10 |
|---|---|---|---|
| Example 1 | 0.12 | 0.07 | 0.06 |
| Example 2 | 0.15 | 0.08 | 0.07 |
| Comp. Example 1 | 17.50 | 17.00 | 16.50 |

TABLE 4

| Time after removal (sec) | 0 | 5 | 10 |
|---|---|---|---|
| Example 1 | −3.20 | −0.35 | −0.08 |
| Example 2 | −2.50 | −0.20 | −0.07 |
| Comp. Example 1 | −15.53 | −15.20 | −14.85 |

As is obvious from the experimental results, the voltages of the packaging pouches in this embodiment are very low, and have excellent effect in preventing the adhesion of dust particles and other contaminants thereto.

In the fourth embodiment, a multilayer laminated sheet is manufactured by a usual laminating process, such as an extrusion laminating process, a dry laminating process, a coextrusion laminating process, a T-die extrusion molding process or an inflation coextrusion molding process. Dust and contaminous particles existing between the component films of the laminated sheet are caught in the molten materials of the component films or in adhesives for laminating the component films when laminating the films. Therefore, when one or two component films of the laminated sheet are removed, clean, dust-free surfaces are exposed to provide a packaging clean film.

Clean packages can be obtained by packaging articles in the packaging clean film in the fourth embodiment, and the antistatic layer of the packaging clean film prevents the adhesion of dust particles and other contaminants to the packaging clean film and the detrimental effect of static electricity and the like on articles packaged in the packaging clean film.

The packaging clean film and the packaging pouch in the fourth embodiment can be used as optimum packaging materials for packaging parts and products to which dust particles and other contaminants are extremely detrimental, such as silicon wafers, magnetic disks, semiconductor devices, photomasks, pellicles and such, and clothing to be worn by persons participating in manufacturing those parts and products.

The packaging clean film and the packaging pouch in the fourth embodiment can be manufactured at low manufacturing costs, have stable cleanliness and are capable of effectively dissipating static electricity generated therein during transportation. Accordingly, the packaging clean film and the packaging pouch are capable of preventing adverse effects on articles packaged therein and articles existing in the vicinity thereof.

Since static electricity generated when the protective layer is removed can be effectively dissipated, articles packaged in the packaging clean film or the packaging pouches, not to mention articles existing near the package or the removed protective layer, can be protected from the adverse effect of the static electricity.

Fifth Embodiment

A fifth embodiment of the present invention will be described with reference to FIGS. 25 to 41.

Mode 1

Figure 25:
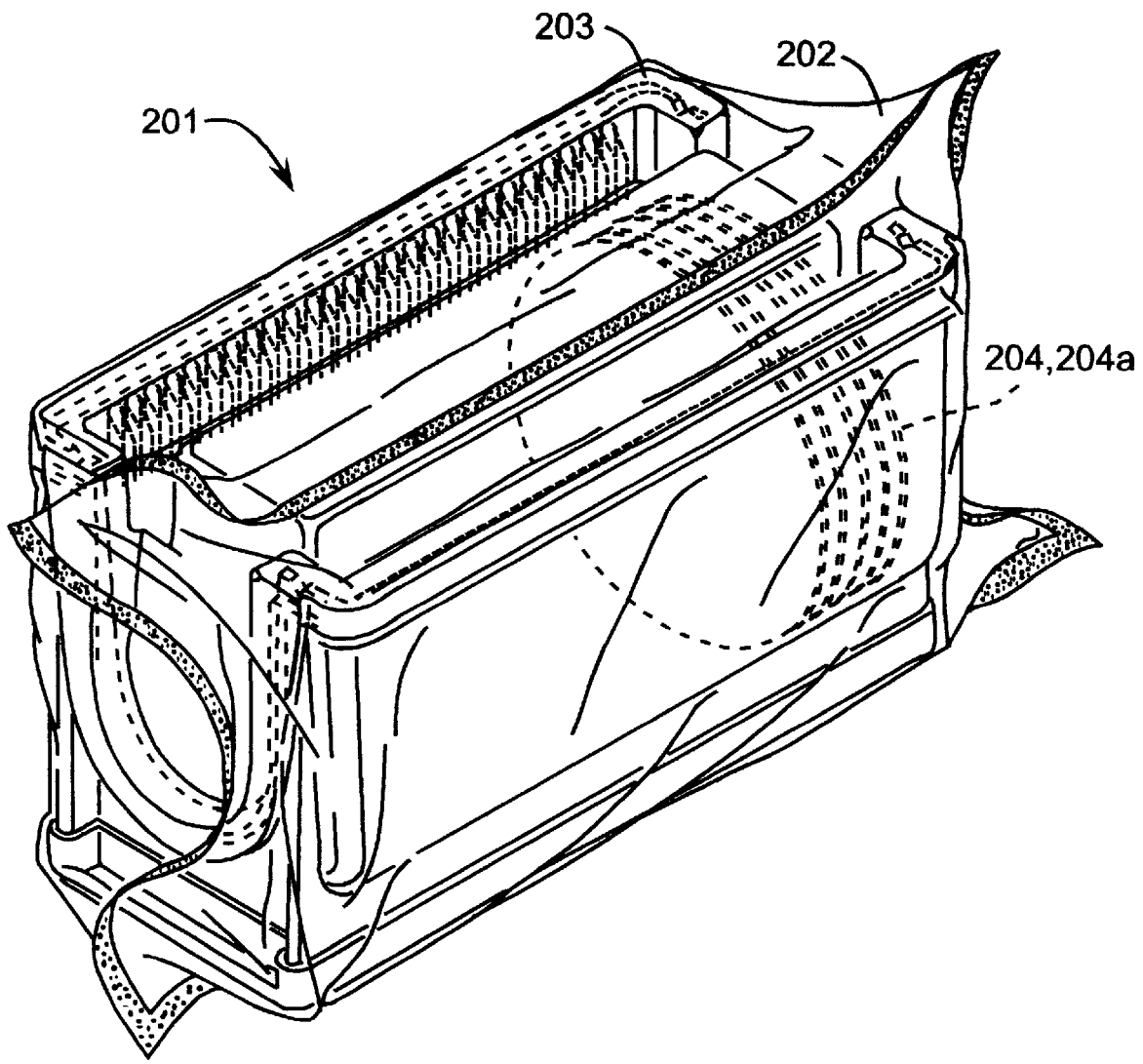
FIG. 25 is a perspective view of a sealed package in a fifth embodiment according to the present invention.

Referring to FIG. 25 showing a sealed package 201, the sealed package 201 is obtained by packaging a hard case 203 containing a plurality of silicon wafers 204 in a clean packaging pouch 202 having clean surfaces. The interior of the clean packaging pouch 202 is evacuated so that the clean packaging pouch 202 adheres closely to the hard case 203 to prevent dust particles from being produced by the movement of the hard case 203 in the clean packaging pouch 202.

Figure 26:
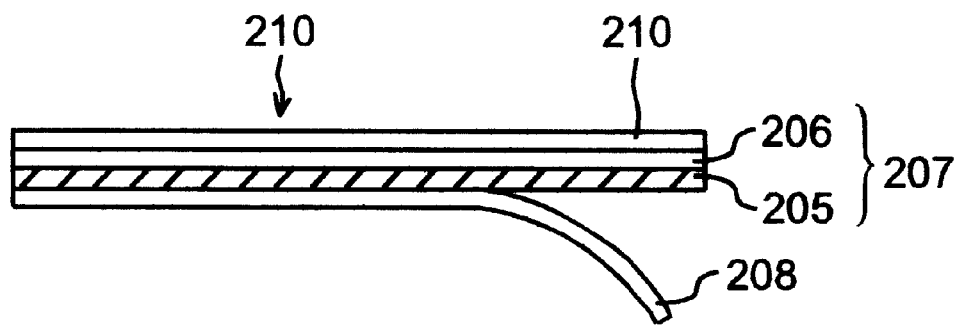
FIG. 26 is a fragmentary sectional view of a packaging clean film for forming a clean packaging pouch forming the sealed package of FIG. 25.
Figure 27:
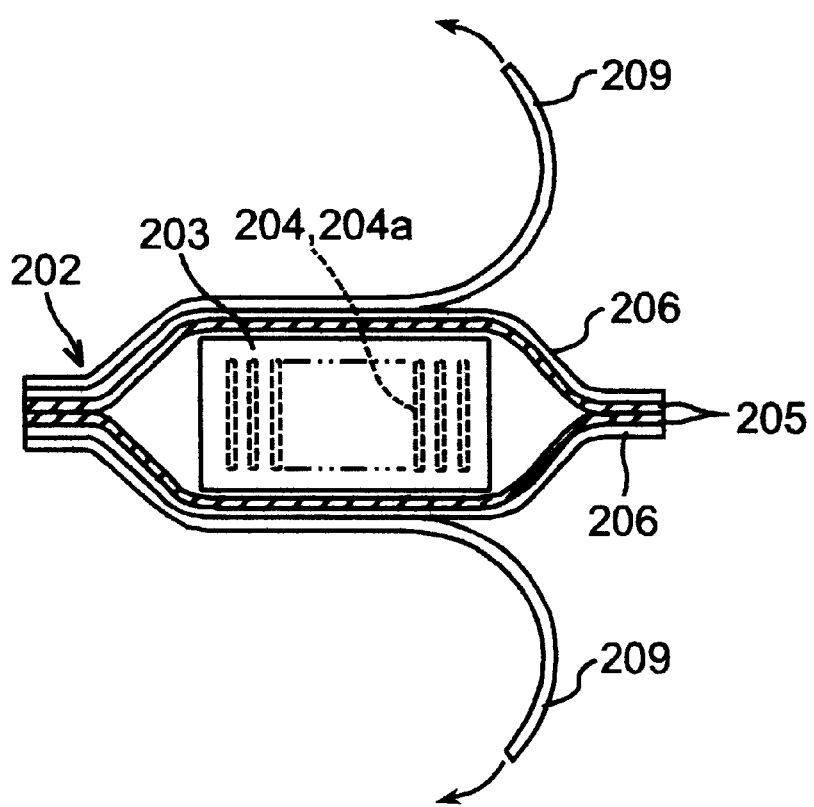
FIG. 27 is a sectional view of the sealed package of FIG. 25 in a state where outer protective layers are being removed from the clean packaging pouch.

The clean packaging pouch 202 is formed by superposing a pair of packaging clean films 210 each having, as shown in FIG. 26, a base structure 207 consisting of a heat-sealing layer 205 and a base layer 206, an inner protective layer 208 laminated to the heat-sealing layer 205 of the base structure 207, and an outer protective layer 209 laminated to the base layer 206 of the base structure 207. As shown in FIG. 26, the inner protective layer 208 of the packaging clean film 210 is peeled off from the base structure 207 when manufacturing the clean packaging pouch 202. As shown in FIG. 27, the outer protective layers 209 are removed from the sealed package 201 formed by sealing the hard case 203 containing the silicon wafers 204 in the clean packaging pouch 202 after the sealed package 201 has been delivered to a destination.

Figure 28:
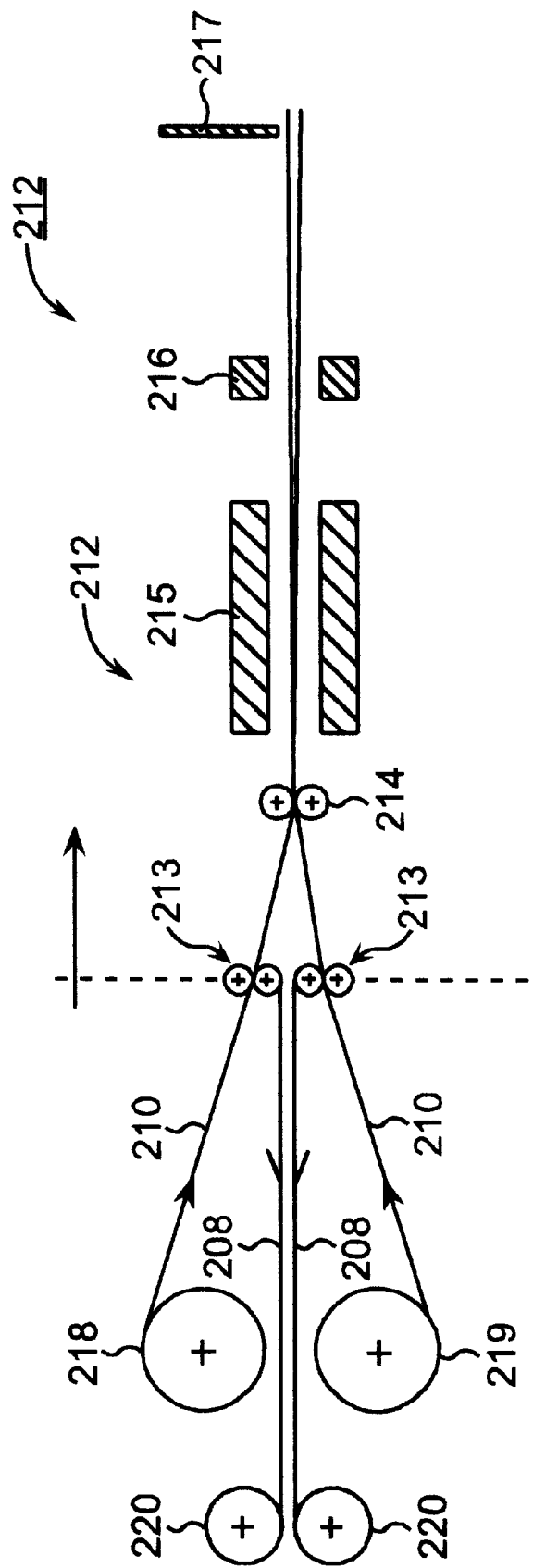
FIG. 28 is a schematic sectional view of a packaging pouch manufacturing apparatus for manufacturing the clean packaging pouch forming the sealed package of FIG. 25.

A packaging pouch manufacturing apparatus 211 for manufacturing the clean packaging pouch 202 by processing the packaging clean film 210 will be described with reference to FIG. 28. Referring to FIG. 28, the packaging pouch manufacturing apparatus 211 comprises a clean chamber 212 maintained in an environment substantially equivalent to a Class 100 environment (0.5 $\mu$m), protective layer peeling rollers 213, a pair of pressure rollers 214, a longitudinal sealing unit 215, a transverse sealing unit 216, a cutting unit 217, a pair of film feed unit 218 and 219, and winding rollers 220 for taking up peeled protective layers. The protective layer peeling rollers 213, the pair of pressure rollers 214, the longitudinal heat-sealing unit 215, the transverse heat-sealing unit 216 and the cutting unit 217 are disposed sequentially in that order in the film feed direction in the clean chamber 211. The pair of film feed unit 218 and 219 and the winding rollers 220 are disposed before the clean chamber 211.

When manufacturing the clean packaging pouch 202 by processing the packaging clean films 210, the packaging clean films 210 are fed from the film feed units 218 and 219 to the peeling rollers 213. The peeling rollers 213 peel off the inner protective layers 208 from the packaging clean films 210. The inner protective layers 208 peeled off from the packaging clean films 210 are taken up by the winding rollers 220, respectively. The peeling rollers 213 superpose the packaging clean films 210 after peeling off the inner protective layers 208, and then feed the packaging clean films 210 superposed with the exposed clean surfaces of the heat-sealing layers 205 extended so as to face each other into the clean chamber 212. The pressure rollers 214 press together the packaging clean films 210, the longitudinal sealing unit 26 seals the opposite side edge portions of the packaging clean films 210 along the traveling direction of the packaging clean films 210 to form longitudinal sealed edge portions, and the transverse sealing unit 216 seals the packaging clean films 210 along the width of the same to form transverse sealed edge portions. Then the cutting unit 217 cuts the pair of weblike packaging clean films 1 along the width of the same to obtain packaging pouches 202 having one open side and three sealed edge portions on its three sides. The longitudinal sealed edge portions and the transverse sealed edge portions may be formed in the pair of packaging clean films 210 so that each packaging pouch 202 has sealed edge portions on its four sides and one of the transverse sealed edge portions may be cut by the cutting unit 217 to form one open side.

Since the inner protective layers 208 are peeled off from the pair of packaging clean films 210 immediately before the pair of packaging clean films 210 are fed into the clean chamber 212, the clean packaging pouches 202 have clean inside surfaces. The clean packaging pouches thus manufactured are collected and packaged in a large clean bag, not shown, for shipment.

Figure 29:
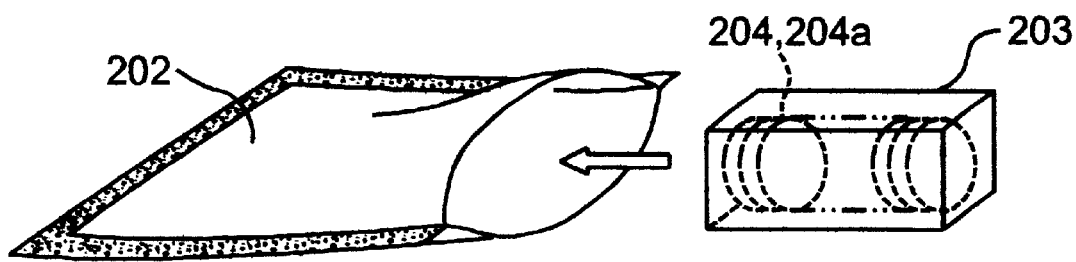
FIG. 29 is a perspective view of assistance in explaining a first step of a sealed package producing process for producing the sealed package of FIG. 25.
Figure 30:
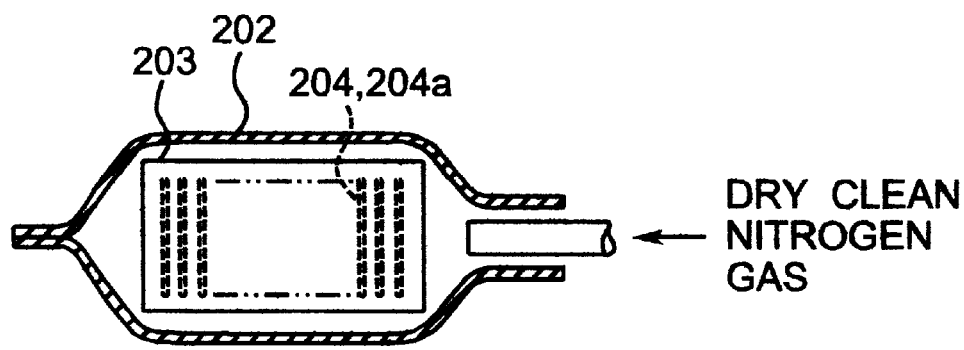
FIG. 30 is a sectional view of assistance in explaining a second step of the sealed package producing process for producing the sealed package of FIG. 25.
Figure 31:
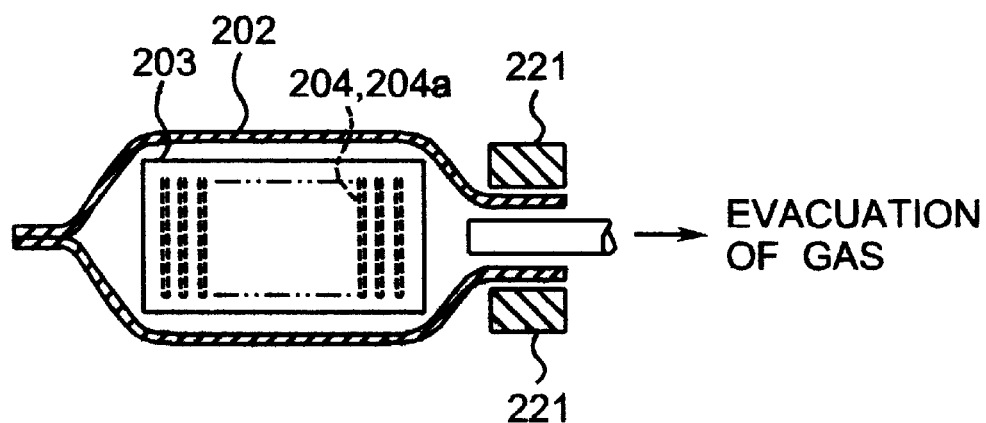
FIG. 31 is a sectional view of assistance in explaining a third step of the sealed package producing process for producing the sealed package of FIG. 25.
Figure 32:
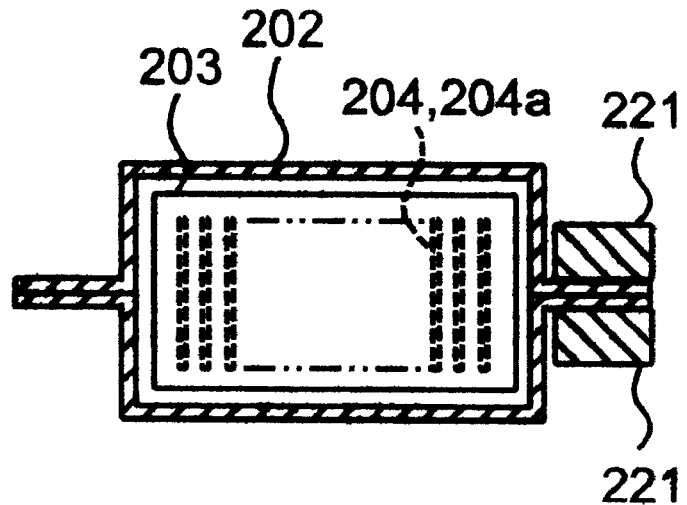
FIG. 32 is a sectional view of assistance in explaining the final step of the sealed package producing process for producing the sealed package of FIG. 25.
Figure 33:
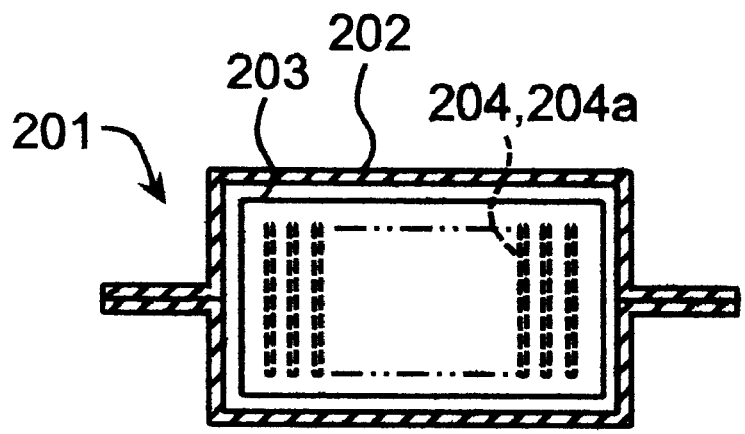
FIG. 33 is a sectional view of the finished sealed package of FIG. 25.

When packaging the hard case 203 containing the plurality of silicon wafers 204 in the clean packaging pouch 202 to provide the sealed package 201, the open side of the clean packaging pouch 202 is opened as shown in FIG. 29 and the hard case 203 containing the silicon wafers 204 is put in the clean packaging pouch 202 as indicated by the arrow. Then, as shown in FIG. 30, dry, clean nitrogen gas is blown through a gas filter of a pore size on the order of 0.1 $\mu$m into the clean packaging pouch 202 containing the hard case 203 to replace the air prevailing between the clean packaging pouch 202 and the hard case 203 with nitrogen gas. Consequently, the initial humidity of the interior of the clean packaging pouch 203 is reduced. Then, the clean packaging pouch 202 containing the hard case 203 and filled with nitrogen gas is sent to a vacuum sealing apparatus. Then, as shown in FIG. 31, the vacuum sealing apparatus evacuates the nitrogen gas from the clean packaging pouch 202 so that the clean packaging pouch 202 adheres closely to the hard case 203, and then seals the open side of the clean packaging pouch 202 as shown in FIG. 32 to provide a heat-sealed package 201 shown in FIG. 33.

The sealed package 201 is transported by a usual transportation route to a clean room in which the silicon wafers are processed. The outer protective layers 209 are peeled off from the clean packaging pouch 202 immediately before carrying the sealed package 201 into the clean room.

Although the packaging clean film 210 has the protective layers on the opposite surfaces of the base layer, respectively, only one protective layer may be formed on only one of the surfaces of the base layer.

Concrete examples of the fifth embodiment will be described hereinafter.

EXAMPLE 1

Example 1 corresponds to the sealed package shown in FIG. 25. The heat-sealing layer 205 of the base structure 207 is a 70 $\mu$m thick polyethylene film formed by laminating 20 $\mu$m thick low-density polyethylene films (LDPE films) to both surfaces of a 30 $\mu$m thick medium-density polyethylene film (MDPE film), respectively. The base layer 206 is a laminated film formed by laminating a 12 $\mu$m thick polyethylene terephthalate film (PET film) coated with a silicon oxide film by evaporation and a 15 $\mu$m thick biaxial oriented nylon film (ONy film). The inner protective layer 208 is a 60 $\mu$m thick nonoriented polypropylene film (CPP film), and the outer protective layer 209 is a laminated film formed by laminating a 60 $\mu$m thick medium-density polyethylene film (MDPE film) and a 20 $\mu$m thick low-density polyethylene film (LDPE film). The packaging clean film thus formed by laminating those films has a construction expressed by:

MDPE 60 $\mu$m/LDPE 20 $\mu$m//SiO$_x$-coated PET 12 $\mu$m/ONy 15 $\mu$m/LDPE 20 $\mu$m/MDPE 30 $\mu$m/LDPE 20 $\mu$m//CPP 60 $\mu$m The packaging clean film of the foregoing construction were processed for bag-making in a Class 100 (0.5 $\mu$m) environment while the 60 $\mu$m thick CPP films were peeled off to obtain a clean packaging pouch. A hard case containing silicon wafers was packaged in the clean packaging pouch by the method described in connection with the Mode 1 to obtain a sealed package.

A packaging pouch of a double-wall construction was formed by combining an inner pouch formed from an 80 μm thick polyethylene film and a 40 μm thick nylon film, and an outer pouch formed from a 100 μm thick polyethylene film, a desiccant was sealed in the space between the outer and the inner pouch, and a sealed package in Comparative example was made by using the packaging pouch.

Comparative Experiments

The sealed packages in Example 1 and Comparative example were kept in an atmosphere of 40° C. and 90% RH to examine the variation of relative humidity in the sealed packages with time.

Figure 34:
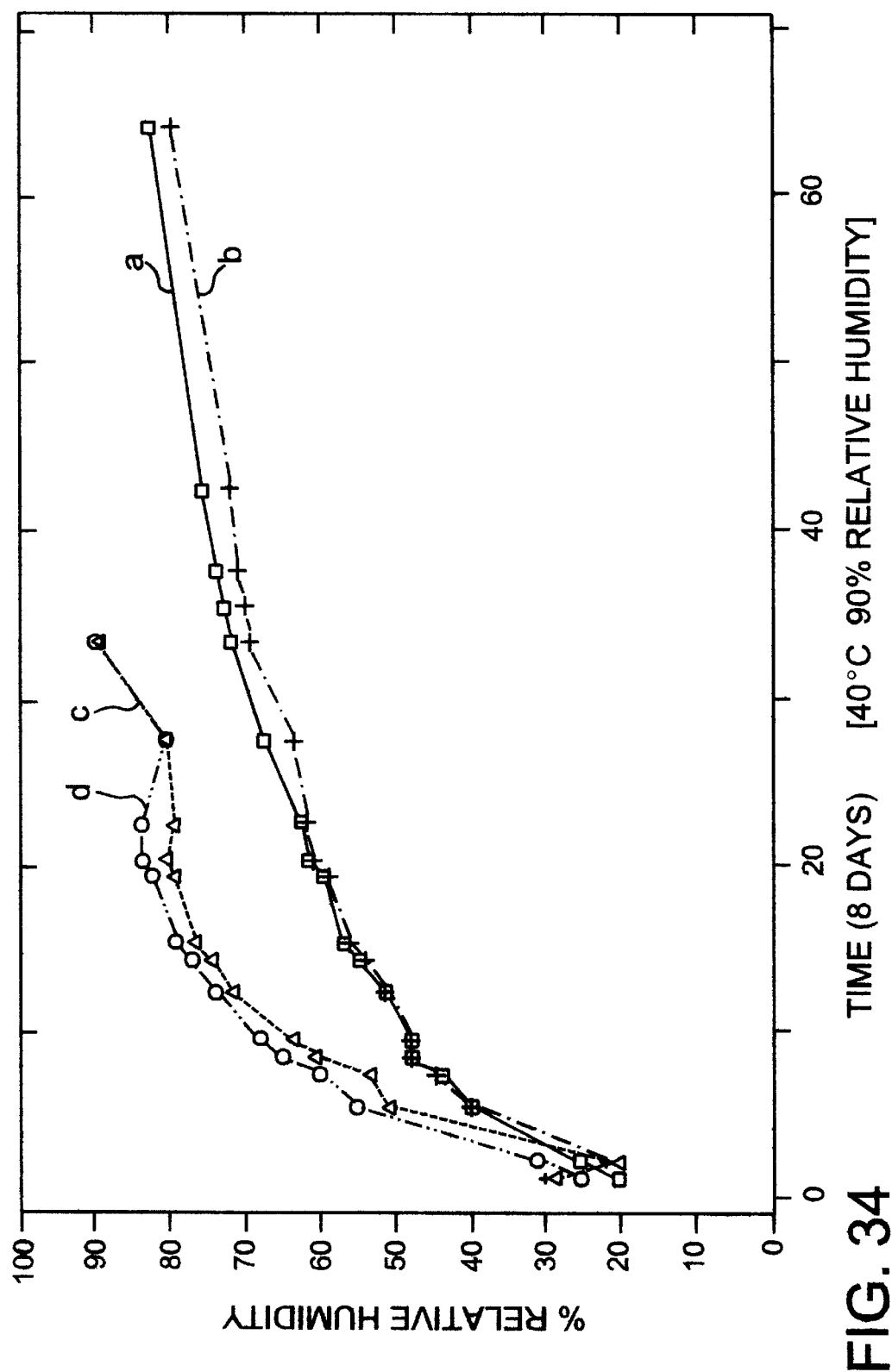
FIG. 34 is a graph showing the variation of relative humidity with time in a clean packaging pouch forming a sealed package in accordance with the present invention.

FIG. 34 shows data obtained through the comparative experiments, in which curves a and b indicate experimental data for the sealed packages in Example 1, and curves c and d indicate experimental data for the sealed packages in Comparative example. As is obvious from FIG. 34, the relative humidity in the sealed packages in Example 1 in accordance with the present invention increased to about 80% RH in 60 days, while the relative humidity in the sealed packages in Comparative example increased to about 80% RH only in fifteen days, which proved the excellent moistureproof performance of the sealed packages in accordance with the present invention.

Mode 2

Figure 35:
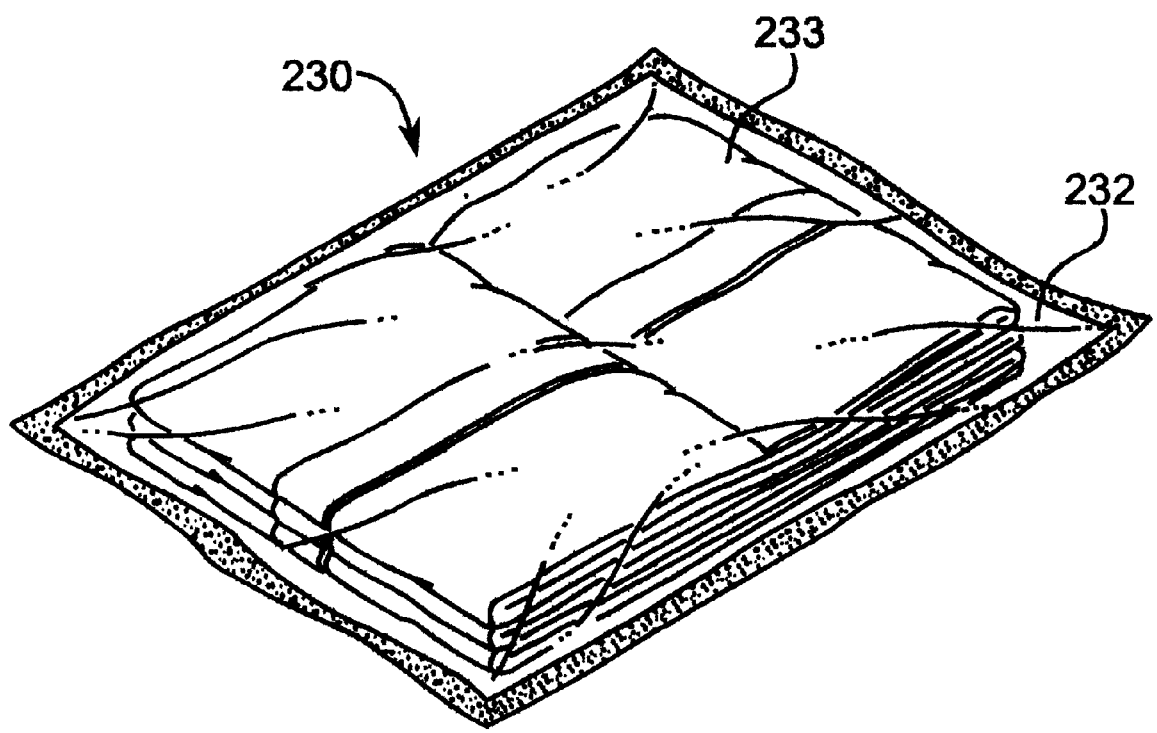
FIG. 35 is a perspective view of another sealed package in accordance with the present invention.

FIG. 35 shows a sealed package 230 in Mode 2 of the present invention. The sealed package 230 is formed by packaging dust-free garments in a clean packaging pouch 232 having clean surfaces. The dust-free garments 233 include dust-free clothes, caps, shoes, gloves and such, which are used in a clean room and made of special materials that may not contaminate the clean room. The dust-free garments must be clean when procured and after cleaned, and packaging pouches for packaging those dust-free garments must be clean.

Figure 36:
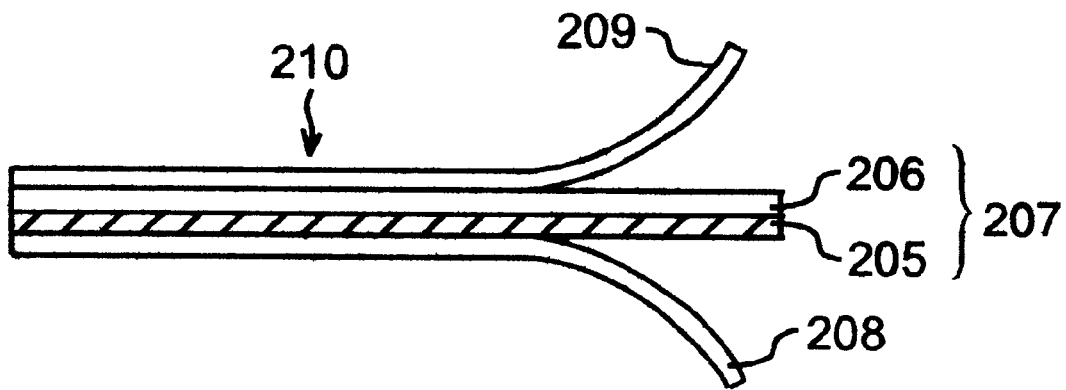
FIG. 36 is a fragmentary sectional view of a packaging clean film forming the clean packaging pouch of the sealed package of FIG. 35.
Figure 37:
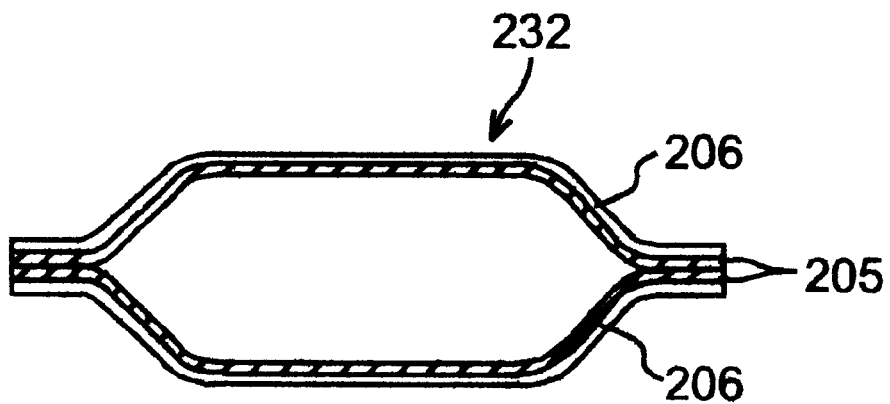
FIG. 37 is a sectional view of the clean packaging pouch of the sealed package of FIG. 35.

The clean packaging pouch 232 is formed by superposing a pair of packaging clean films 210 each comprising, as shown in FIG. 36, a base structure 207 consisting of a heat-sealing layer 205 and a base layer 206, an inner protective layer 208 laminated to the heat-sealing layer 205 of the base structure 207, and an outer protective layer 209 laminated to the base layer 206 of the base structure 207. The inner protective layer 208 and the outer protective layer 209 of each packaging clean film 210 are peeled off from the base structure 207 when forming the clean packaging pouch 232 as shown in FIG. 37.

Figure 38:
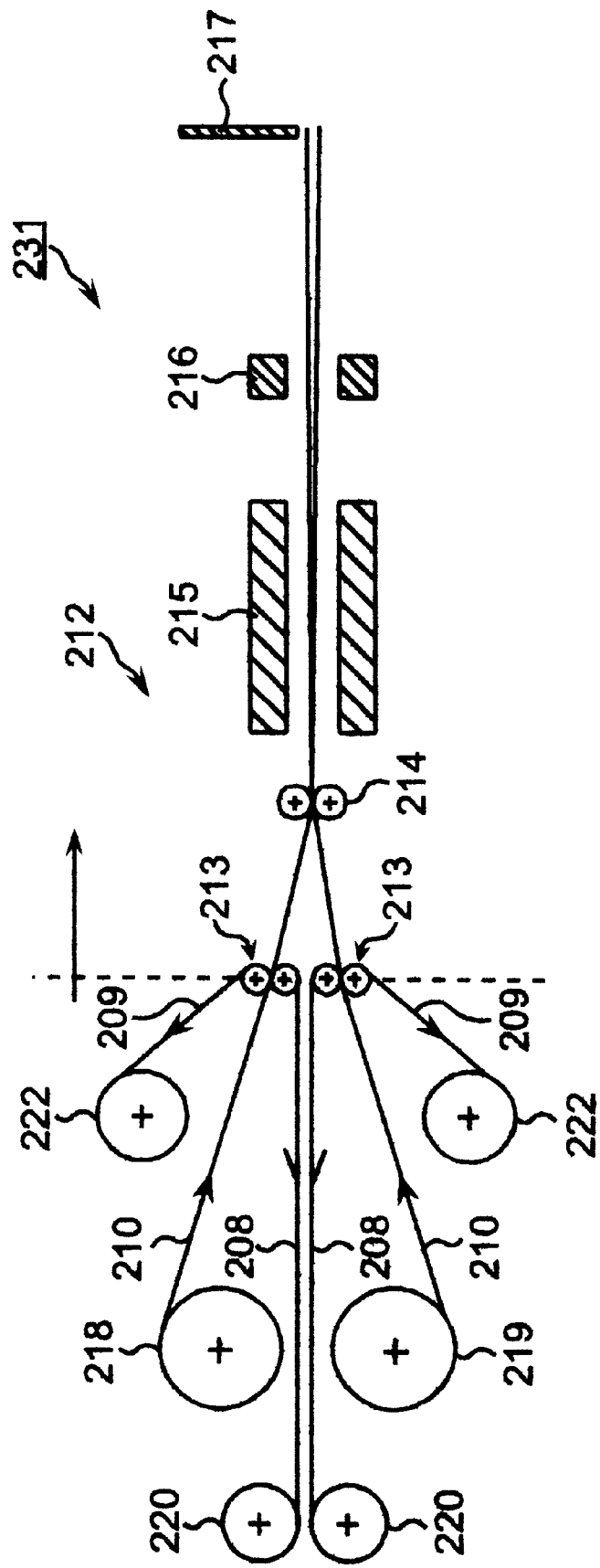
FIG. 38 is a schematic view of a packaging pouch manufacturing apparatus for manufacturing the clean packaging pouch of FIG. 37.

A packaging pouch manufacturing apparatus 231 for manufacturing the clean packaging pouch 232 will be described with reference to FIG. 38. The packaging pouch manufacturing apparatus 231 shown in FIG. 38 is substantially the same in constitution as the packaging pouch manufacturing apparatus 211 shown in FIG. 28, except that the packaging pouch manufacturing apparatus 231 has winding rollers 222 disposed before a clean chamber 212 to take up the outer protective layers 209 peeled off from the packaging clean films 210.

When manufacturing the clean packaging pouch 232 by processing the packaging clean films 210, the packaging clean films 210 are fed to peeling rollers 213, and the outer protective layers 209 and the inner protective layers 208 are peeled off from the packaging clean films 210 by the peeling rollers 213. The peeled outer protective layers 209 and the peeled inner protective layers 208 are taken up by the winding rollers 222 and winding rollers 220, respectively. The peeling rollers 213 superpose the packaging clean films 210 after peeling off the outer protective layers 209 and the inner protective layers 208, and then feed the packaging clean films 210 having exposed clean surfaces of the heat-sealing layers 205 and the base layers 206 and superposed with the exposed clean surfaces of the heat-sealing layers 205 extended so as to face each other into a clean chamber 212. The packaging clean films 210 are processed by the same method as that carried out by the packaging pouch manufacturing apparatus 211 shown in FIG. 28 to obtain clean packaging pouches 232 having one open side.

Since the outer protective layers 209 and the inner protective layers 208 are peeled off from the pair of packaging clean films 210 immediately before the packaging clean films 210 are fed into the clean chamber 212, the clean packaging pouch 232 is clean in both the outside and the inside surface.

The clean packaging pouches 232 are collected and packaged in a large clean bag, not shown, for shipment. Dust-free garments 231 are put in the clean packaging pouch 232 and the open side of the clean packaging pouch 232 is heat-sealed at the place of use, such as a dust-free garment manufacturing plant or a cleaning plant, to provide the sealed package 230 shown in FIG. 35.

Although the outer protective layers 209 are removed in the process of manufacturing the clean packaging pouch 232 in Mode 2, the outer protective layers 209 may be kept unremoved during the packaging pouch manufacturing process like the packaging pouch manufacturing process in Mode 1 did, and the outer protective layers 209 may be removed immediately before the sealed package is carried into the clean room. The base structure 207 consisting of the heat-sealing layer 205 and the base layer 206 may be substituted by a single film having the functions of both the heat-sealing layer 205 and the base layer 206.

Examples of the fifth embodiment will be described hereinafter.

EXAMPLE 2

Example 2 corresponds to the example shown in FIG. 35. A nylon resin (CNy) and a low-density polyethylene resin (LDPE resin) were extruded by a multilayer melt-extruder to form a three-layer coextruded film (packaging clean film) having a construction expressed by:

CNy 15 μm//LDPE 50 μm//CNy 15 μm

One of the 15 μm thick CNy films, the 50 μm thick LDPE film and the other 15 μm thick CNy film of the three-layer coextruded film serve as the outer protective layer 209, a base film functioning as the base structure 207, and the inner protective layer 208, respectively. The side of the inner protective layer 208 of the 50 μm thick LDPE film, serves also as the heat-sealing layer 205.

The 15 μm thick CNy films were peeled of f and the three-layer coextruded films were processed in a Class 100 environment (0.5 μm) to form a clean packaging pouch. Cleaned dust-free garments were sealed in the clean packaging pouch in a clean environment to provide a sealed package.

A sealed package as a comparative example was formed by using a packaging pouch formed by processing general LDPE films (50 μm thick Tamapoly V-1) using an impulse sealer.

The sealed packages in Example 2 and the comparative example were opened after lightly beating the same by hand, the dust-free garments were taken out from the clean packaging pouches, the surfaces of the dust-free garments were blown clean with an ionizing air gun, and scattered dust particles were counted by a particle counter. The number of particles of 0.5 μm or above in particle size per one liter of air was calculated to evaluate the contamination level of the dust-free garments. The number of particles emanated from the dust-free garments taken out from the sealed package in the comparative example and contained in one liter of air was 1,270, while that of particles emanated from the dust-free garments taken out from the sealed package in Example 2 and contained in one liter of air was eight. It is obvious from the measured results that the number of particles adhering to the sealed package in Example 2 is far less than that of particles adhering to the sealed package in the comparative example, which proves that the sealed package in accordance with the present invention has excellent effect in keeping the contents at a low contamination level.

Mode 3

Figure 39:
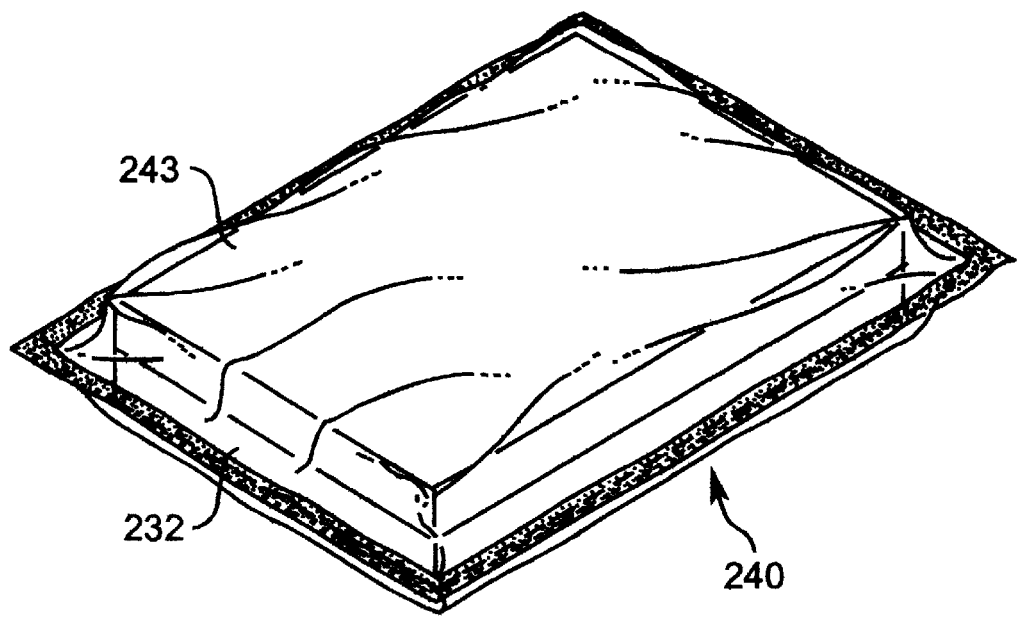
FIG. 39 is a perspective view of a further sealed package in accordance with the present invention.

A further example of a sealed package in accordance with the present invention will be described hereinafter with reference to FIG. 39 showing a sealed package 240 in Mode 3, in which parts like or corresponding to those of the sealed package 230 shown in FIG. 35 are designated by the same reference characters and the description thereof will be omitted.

The sealed package 240 is formed by sealing clean filters 243 in a clean packaging pouch 232 having clean surfaces. The clean filters 243 are high-performance filters for use on an air handling system for supplying clean air into a clean room or a water purifying apparatus for producing ultrapure water. The clean filters 243 are packaged in the clean packaging pouch 232 at a place of use, such as a filter manufacturing plant, the open side of the clean packaging pouch 232 is heat-sealed to provide the sealed package 240 shown in FIG. 39.

EXAMPLE 3

Example 3 corresponds the sealed package shown in FIG. 39. A nylon resin (CNy) and a low-density polyethylene resin (LDPE resin) were extruded by a multilayer melt-extruder to form a three-layer coextruded film (packaging clean film) having a construction expressed by:

CNy 15 μm//LDPE 50 μm//CNy 15 μm

One of the 15 μm thick CNy films, the 50 μm thick LDPE film and the other 15 μm thick CNy film of the three-layer coextruded film serve as the outer protective layer 209, a base film functioning as the base structure 207, and the inner protective layer 208, respectively. The side of the inner protective layer 208 of the 50 μm thick LDPE film, serves also as the heat-sealing layer 205.

The 15 μm thick CNy films were peeled off and the three-layer coextruded films were processed in a Class 100 environment (0.5 μm) to form a clean packaging pouch. Air filters for air purification thoroughly blown clean with an ionizing air gun were put in the clean packaging pouch in a clean environment and the clean packaging pouch was sealed to provide a sealed package.

A sealed package as a comparative example was formed by using a packaging pouch formed by processing general LDPE films (50 μm thick Tamapoly V-1) using an impulse sealer.

The sealed packages in Example 3 and the comparative example were opened after stirring the air filters in the clean packaging pouches, the air filters were taken out from the clean packaging pouches, the surfaces of the air filters were blown with an ionizing air gun, and scattered dust particles were counted by a particle counter. The number of particles of 0.5 μm or above in particle size per one liter of air was calculated to evaluate the contamination level of the air filters. The number of particles emanated from the air filters taken out from the sealed package in the comparative example and contained in one liter of air was 350, while that of particles emanated from the air filters taken out from the sealed package in Example 3 and contained in one liter of air was twelve. It is obvious from the measured results that the number of particles adhering to the inside surface of the sealed package in Example 3 is far less than that of particles adhering to the inside surface of the sealed package in the comparative example, which proves that the sealed package in accordance with the present invention has excellent effect in keeping the contents at a low contamination level.

Mode 4

Figure 40:
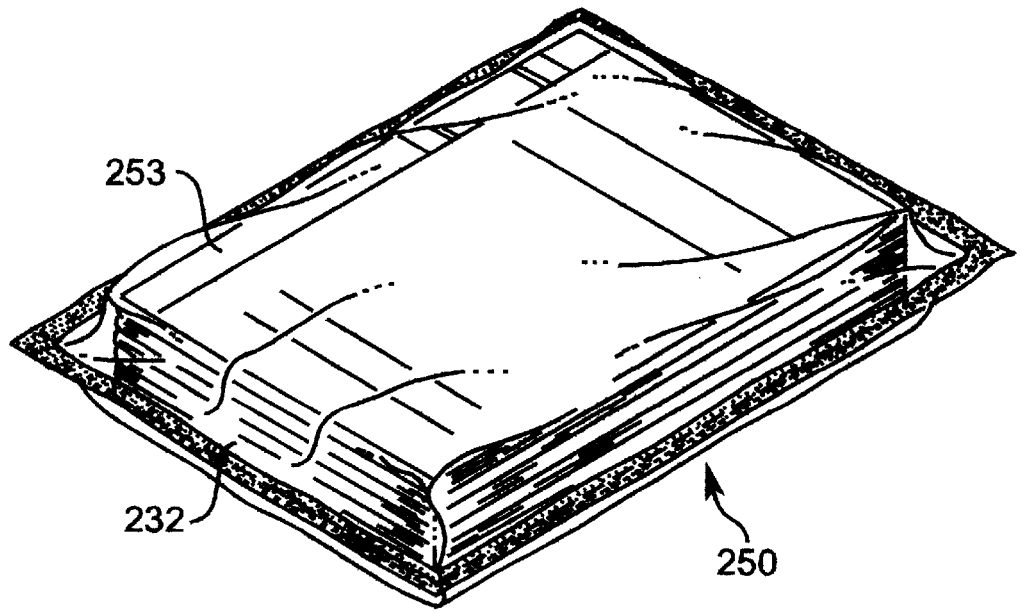
FIG. 40 is a perspective view of a further sealed package in accordance with the present invention.

A further example of a sealed package in accordance with the present invention will be described hereinafter with reference to FIG. 40 showing a sealed package 250 in Mode 4, in which parts like or corresponding to those of the sealed package 230 shown in FIG. 35 are designated by the same reference characters and the description thereof will be omitted.

The sealed package 240 is formed by sealing clean room supplies 253 in a clean packaging pouch 232 having clean surfaces. The clean room supplies include, for example, notebooks and recording sheets to be used in a clean room. The clean room supplies 253 are packaged in the clean packaging pouch 232 at a place of use, such as a clean room supply manufacturing plant, the open side of the clean packaging pouch 232 is heat-sealed to provide the sealed package 250 shown in FIG. 40. An example of the Mode 4 will be described hereinafter.

EXAMPLE 4

Example 4 corresponds to the sealed package shown in FIG. 40. A nylon resin (CNy) and a low-density polyethylene resin (LDPE resin) were extruded by a multilayer melt-extruder to form a three-layer coextruded film (packaging clean film) having a construction expressed by:

CNy 15 μm//LDPE 50 μm//CNy 15 μm

One of the 15 μm thick CNy films, the 50 μm thick LDPE film and the other 15 μm thick CNy film of the three-layer coextruded film serve as the outer protective layer 209, a base film functioning as the base structure 207, and the inner protective layer 208, respectively. The side of the inner protective layer 208 of the 50 μm thick LDPE film, serves also as the heat-sealing layer 205.

The 15 μm thick CNy films were peeled off and the three-layer coextruded films were processed in a Class 100 environment (0.5 μm) to form a clean packaging pouch. Dust-free notebooks thoroughly blown clean with an ionizing air gun were put in the clean packaging pouch in a clean environment and the clean packaging pouch was sealed to provide a sealed package.

A sealed package as a comparative example was formed by using a packaging pouch formed by processing general LDPE films (50 μm thick Tamapoly V-1) using an impulse sealer.

The sealed packages in Example 4 and the comparative example were opened after stirring the dust-free notebooks in the clean packaging pouches, the dust-free notebooks were taken out from the clean packaging pouches, the surfaces of the air filters were blown with an ionizing air gun, and scattered dust particles were counted by a particle counter. The number of particles of 0.5 μm or above in particle size per one liter of air was calculated to evaluate the contamination level of the dust-free notebooks. The number of particles emanated from the dust-free notebooks taken out from the sealed package in the comparative example and contained in one liter of air was 853, while that of particles emanated from the dust-free notebooks taken out from the sealed package in Example 4 and contained in one liter of air was twenty. It is obvious from the measured results that the number of particles adhering to the inside surface of the sealed package in Example 4 is far less than that of particles adhering to the inside surface of the sealed package in the comparative example, which proves that the sealed package in accordance with the present invention has excellent effect in keeping the contents at a low contamination level.

Mode 5

Figure 41:
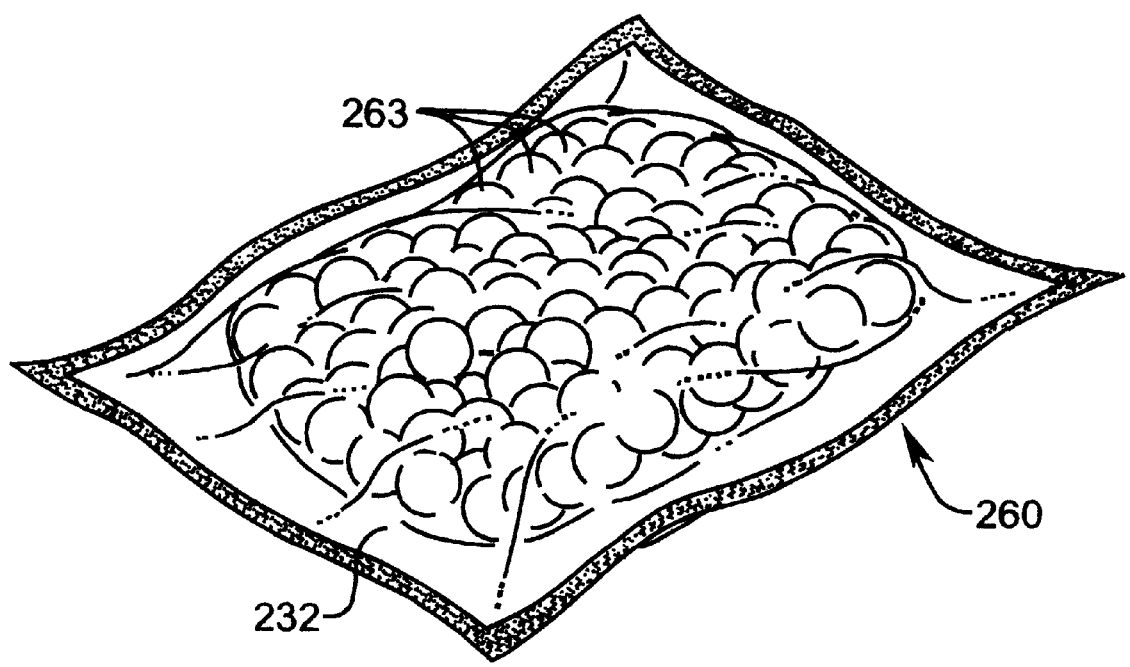
FIG. 41 is a perspective view of a further sealed package in accordance with the present invention.

A further example of a sealed package in accordance with the present invention will be described hereinafter with reference to FIG. 41 showing a sealed package 260 in Mode 5, in which parts like or corresponding to those of the sealed package 230 shown in FIG. 35 are designated by the same reference characters and the description thereof will be omitted.

The sealed package 260 is formed by sealing pharmaceutical articles 263 in a clean packaging pouch 232 having clean surfaces. The pharmaceutical articles include, for example, bare pharmaceutical tablets to which dust particles, contaminants and bacilli are extremely detrimental. The pharmaceutical articles 263 are packaged in the clean packaging pouch 232 at a place of use, such as a pharmaceutical plant, the open side of the clean packaging pouch 232 is heat-sealed to provide the sealed package 260 shown in FIG. 41. The sealed package may contain semiconductor devices, optical devices, pellicles, liquid-crystal filters, photomasks or clean room supplies.

According to the present invention, since the protective layers are removed to expose the clean surfaces of the clean packaging pouch of the sealed package, the hard case and the silicon wafers can be easily sealed in the packaging pouch in a stable cleanliness without requiring rinsing the packaging materials with ultrapure water.

Since the protective layers are removed to expose the clean surfaces of the clean packaging pouch of the sealed package, the dust-free garments can be easily sealed in the packaging pouch in a stable cleanliness without requiring rinsing the packaging materials with ultrapure water.

Since the protective layers are removed to expose the clean surfaces of the clean packaging pouch of the sealed package, the clean filters can be easily sealed in the packaging pouch in a stable cleanliness without requiring rinsing the packaging materials with ultrapure water.

Since the protective layers are removed to expose the clean surfaces of the clean packaging pouch of the sealed package, the clean room supplies can be easily sealed in the packaging pouch in a stable cleanliness without requiring rinsing the packaging materials with ultrapure water.

Since the protective layers are removed to expose the clean surfaces of the clean packaging pouch of the sealed package, the pharmaceutical articles can be easily sealed in the packaging pouch in a stable cleanliness without requiring rinsing the packaging materials with ultrapure water.

Sixth Embodiment

A sixth embodiment of the present invention will be described hereinafter with reference to FIGS. 25 to 34 employed in describing the fifth embodiment.

Referring to FIG. 25 showing a hard disk package 201, the hard disk package 201 is obtained by packaging a hard disk case 203 containing a plurality of hard disk substrate 204a in a clean packaging pouch 202 having clean surfaces. The interior of the clean packaging pouch 202 is evacuated so that the clean packaging pouch 202 adheres closely to the hard disk case 203 to prevent dust particles from being produced by the movement of the hard disk case 203 in the clean packaging pouch 202.

The clean packaging pouch 202 is formed by superposing a pair of packaging clean films 210 each having, as shown in FIG. 26, a base structure 207 consisting of a heat-sealing layer 205 and a base layer 206, an inner protective layer 208 laminated to the heat-sealing layer 205 of the base structure 207, and an outer protective layer 209 laminated to the base layer 206 of the base structure 207. The heat-sealing layer 205 of the base structure 207 is a 70 $\mu$m thick polyethylene film formed by laminating 20 $\mu$m thick low-density polyethylene film, a 30 $\mu$m thick medium-density polyethylene film and a 20 $\mu$m thick low-density polyethylene film. The base layer 206 is a laminated film formed by laminating a 12 $\mu$m thick polyethylene terephthalate film coated with a silicon oxide film by evaporation and a 15 $\mu$m thick biaxial oriented nylon film. The inner protective layer 208 is, for example, a 60 $\mu$m thick nonoriented polypropylene film, and the outer protective layer 209 is, for example, a laminated film formed by laminating a 60 $\mu$m thick medium-density polyethylene film and a 20 $\mu$m thick low-density polyethylene film. As shown in FIG. 26, the inner protective layer 208 of the packaging clean film 210 is peeled off from the base structure 207 when manufacturing the clean packaging pouch 202. As shown in FIG. 27, the outer protective layers 209 are removed from the hard disk package 201 formed by sealing the hard disk case 203 containing the hard disk substrates 204a in the clean packaging pouch 202 after the hard disk package 201 has been delivered to a destination.

A packaging pouch manufacturing apparatus 211 for manufacturing the clean packaging pouch 202 by processing the packaging clean film 210 will be described with reference to FIG. 28. Referring to FIG. 28, the packaging pouch manufacturing apparatus 211 comprises a clean chamber 212 maintained in an environment substantially equivalent to a Class 100 environment (0.5 $\mu$m), protective layer peeling rollers 213, a pair of pressure rollers 214, a longitudinal sealing unit 215, a transverse sealing unit 216, a cutting unit 217, a pair of film feed unit 218 and 219, and winding rollers 220 for taking up peeled protective layers. The protective layer peeling rollers 213, the pair of pressure rollers 214, the longitudinal heat-sealing unit 215, the transverse heat-sealing unit 216 and the cutting unit 217 are disposed sequentially in that order in the film feed direction in the clean chamber 211. The pair of film feed unit 218 and 219 and the winding rollers 220 are disposed before the clean chamber 211.

When manufacturing the clean packaging pouch 202 by processing the packaging clean films 210, the packaging clean films 210 are fed from the film feed units 218 and 219 to the peeling rollers 213. The peeling rollers 213 peel off the inner protective layers 208 from the packaging clean films 210. The inner protective layers 208 peeled off from the packaging clean films 210 are taken up by the winding rollers 220, respectively. The peeling rollers 213 superpose the packaging clean films 210 after peeling off the inner protective layers 208, and then feed the packaging clean films 210 superposed with the exposed clean surfaces of the heat-sealing layers 205 extended so as to face each other into the clean chamber 212. The pressure rollers 214 press together the packaging clean films 210, the longitudinal sealing unit 26 seals the opposite side edge portions of the packaging clean films 210 along the traveling direction of the packaging clean films 210 to form longitudinal sealed edge portions, and the transverse sealing unit 216 seals the packaging clean films 210 along the width of the same to form transverse sealed edge portions. Then the cutting unit 217 cuts the pair of weblike packaging clean films 1 along the width of the same to obtain packaging pouches 202 having one open side and three sealed edge portions on its three sides. The longitudinal sealed edge portions and the transverse sealed edge portions may be formed in the pair of packaging clean films 210 so that each packaging pouch 202 has sealed edge portions on its four sides and one of the transverse sealed edge portions may be cut by the cutting unit 217 to form one open side.

Since the inner protective layers 208 are peeled off from the pair of packaging clean films 210 immediately before the pair of packaging clean films 210 are fed into the clean chamber 212, the clean packaging pouches 202 have clean inside surfaces. The clean packaging pouches thus manufactured are collected and packaged in a large clean bag, not shown, for shipment.

When packaging the hard disk case 203 containing the plurality of hard disk substrates 204a in the clean packaging pouch 202 to provide the sealed package 201, the open side of the clean packaging pouch 202 is opened as shown in FIG. 29 and the hard disk case 203 containing the hard disk substrates 204a is put in the clean packaging pouch 202 as indicated by the arrow. Then, as shown in FIG. 30, dry, clean nitrogen gas is blown through a gas filter of a pore size on the order of 0.1 $\mu$m into the clean packaging pouch 202 containing the hard disk case 203 to replace the air prevailing between the clean packaging pouch 202 and the hard disk case 203 with nitrogen gas. Consequently, the initial humidity of the interior of the clean packaging pouch 203 is reduced. Then, the clean packaging pouch 202 containing the hard disk case 203 and filled with nitrogen gas is sent to a vacuum sealing apparatus. Then, as shown in FIG. 31, the vacuum sealing apparatus evacuates the nitrogen gas from the clean packaging pouch 202 so that the clean packaging pouch 202 adheres closely to the hard disk case 203, and then seals the open side of the clean packaging pouch 202 by a heat-sealing bars 222 as shown in FIG. 32 to provide a heat-sealed hard disk package 201 shown in FIG. 33.

The hard disk package 201 is transported by a usual transportation route to a clean room in which hard disks are manufactured. The outer protective layers 209 are peeled off from the clean packaging pouch 202 immediately before carrying the hard disk package 201 into the clean room.

Although the packaging clean film 210 has the protective layers on the opposite surfaces of the base layer, respectively, only one protective layer may be formed on only one of the surfaces of the base layer.

FIG. 34 shows data obtained through experiments, in which curves a and b indicate experimental data for the hard disk packages in the sixth embodiment, and curves c and d indicate experimental data for hard disk packages in comparative examples, i.e., hard disk packages obtained by packaging hard disk substrates in a double-wall pouch.

CONDITIONS FOR EXPERIMENTS

Samples

EXAMPLE

Packaging pouch: The packaging pouch was formed by processing packaging clean films each comprising a 80 $\mu$m thick polyethylene film, a base structure consisting of a 12 $\mu$m thick polyethylene terephthalate film coated with a silicon oxide film by evaporation, and a 15 $\mu$m thick biaxial oriented nylon film, and a 70 $\mu$m thick polyethylene film.

Comparative Example

Packaging pouch: The packaging pouch was formed by combining an inner pouch of a film formed by laminating an 80 $\mu$m thick polyethylene film and a 40 $\mu$m thick nylon film, and an outer pouch of a 100 $\mu$m thick polyethylene film, and sealing a desiccant in the space between the outer and the inner pouch.

Measuring Conditions

Temperature: 40° C., Humidity: 90% RH

Results

As is obvious from FIG. 34, the relative humidity in Example in accordance with the present invention increased to about 80% RH in 60 days, while the relative humidity in the sealed packages in Comparative example increased to about 80% RH only in fifteen days.

As is apparent from the foregoing description, according to the present invention, the clean surfaces of the clean packaging pouch are exposed when the protective layers are removed and hence any cleaning means for cleaning the clean packaging pouch with ultrapure water is not necessary. Since the clean packaging pouch adheres closely to the hard disk case when the clean packaging pouch is evacuated, the production of dust particles due to the movement of the hard disk case in the clean packaging pouch can be prevented, and, if the hard disk case is provided with a bar code or the like for hard disk case management, the bar code can be read from outside.

What is claimed is:

1. A packaging clean film comprising:

a heat-resistant base structure;

a first melt-extruded low-density polyethylene resin film laminated to one surface of the heat-resistant base structure;

a second melt-extruded low-density polyethylene resin film laminated to the other surface of the heat-resistant base structure;

a first protective layer laminated directly to the first melt-extruded film; and a second protective layer laminated directly to the second melt-extruded film, wherein said first and second melt-extruded low-density polyethylene resin films and said first and second protective films are so arranged that said first and second melt-extruded low-density polyethylene resin films become exposed to the outside when said first and second protective layers are peeled off from said first and second melt-extruded low-density polyethylene resin films.

2. The packaging clean film of claim 1, further comprising an anchor film formed between the heat-resistant base structure and the first melt-extruded film or between the heat-resistant base structure and the second melt-extruded film, so that the protective layer can be peeled off from the melt-extruded film corresponding to the anchor film.

* * * * *